United States Patent
Furumiya et al.

(10) Patent No.: US 6,894,965 B2
(45) Date of Patent: May 17, 2005

(54) METHOD FOR RECORDING/ REPRODUCING DATA ON/FROM OPTICAL DISK

(75) Inventors: Shigeru Furumiya, Hyogo (JP); Mamoru Shoji, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 406 days.

(21) Appl. No.: 10/221,007

(22) PCT Filed: Apr. 6, 2001

(86) PCT No.: PCT/JP01/03016

§ 371 (c)(1),
(2), (4) Date: Sep. 6, 2002

(87) PCT Pub. No.: WO01/78072

PCT Pub. Date: Oct. 18, 2001

(65) Prior Publication Data

US 2003/0031108 A1 Feb. 13, 2003

(51) Int. Cl.$^7$ .................................................. G11B 7/00
(52) U.S. Cl. .................................................. 369/59.12
(58) Field of Search ........................ 369/59.11, 59.12, 369/59.16, 59.19, 59.26, 116

(56) References Cited

U.S. PATENT DOCUMENTS

| | | | |
|---|---|---|---|
| 6,426,929 B1 * | 7/2002 | Watabe et al. | 369/59.12 |
| 6,459,670 B1 * | 10/2002 | Kuwahara et al. | 369/59.12 |
| 6,510,116 B1 * | 1/2003 | Miyagawa et al. | 369/59.12 |
| 6,781,937 B2 * | 8/2004 | Nakajo | 369/59.12 |

FOREIGN PATENT DOCUMENTS

| | | |
|---|---|---|
| EP | 0 902 424 A1 | 3/1999 |
| EP | 0 932 144 A2 | 7/1999 |
| JP | 1-150230 | 6/1989 |
| JP | 3-54739 | 3/1991 |
| JP | 4-209318 | 7/1992 |
| JP | 11-102522 | 4/1999 |
| JP | 11-213389 | 6/1999 |
| WO | 00/16322 | 3/2000 |

* cited by examiner

Primary Examiner—Thang V. Tran
Assistant Examiner—Bach Vuong
(74) Attorney, Agent, or Firm—Renner, Otto, Boisselle & Sklar, LLP

(57) ABSTRACT

A shortest mark 108 is recorded with a single recording pulse. A long mark 125 is recorded with a two-stage pulse including a first-part pulse and a second-part pulse. In the case where each of positions 115 and 118 of front edges of the recording pulses is determined based on a relationship between a length of a space immediately before a mark and that of the mark itself so as to properly position the front edges of reproduced waveforms of all the mark lengths and each of positions of rear edges of the recording pulses of all the mark lengths is fixed so as to satisfy a prescribed relative relationship with an edge of a recording clock, power 122 of a recording pulse 101 of the shortest mark is determined so as to realize a proper rear edge position 112 of the reproduced waveform of the shortest mark and power 124 of a second-part pulse 104 is determined for each mark length so as to realize a proper rear edge position 123 of the reproduced waveform of the long mark.

12 Claims, 16 Drawing Sheets

FIG. 4A

Positional conditions of front edge

| | Length of mark itself | | | |
|---|---|---|---|---|
| Length of space immediately before mark | | 3m | 4m | ≧5m |
| | 3s | 113 | 116 | 119 |
| | 4s | 114 | 117 | 120 |
| | ≧5s | 115 | 118 | 121 |

FIG. 4B

Conditions of mark recording power

| | Length of mark itself | | |
|---|---|---|---|
| | 3m | 4m | ≧5m |
| Single pulse or first-part pulse | 122(=126,127) | | |
| Second-part pulse | | 124 | 128 |

FIG. 4C

Positional conditions of edge

| | Length of mark itself | | |
|---|---|---|---|
| | 3m | 4m | ≧5m |
| Front edge | 215 | 217 | 219 |
| Rear edge | 221 | 223 | 225 |

FIG. 4D

Conditions of recording power

| | Length of mark itself | | |
|---|---|---|---|
| | 3m | 4m | ≧5m |
| First-part pulse | 226(=227,228) | | |
| Second-part pulse | | 229(=230) | |

| Length of space | | |
|---|---|---|
| 3s | 4s | ≧5s |
| 260 | 261 | 262 |

FIG.17A

Recording compensation conditions
First pulse start position table

|  | self-length of mark | | | |
|---|---|---|---|---|
|  | 3T | 4T | 5T | >5T |
| Length of space before mark 3T | Aa | Ab | Ac | Ad |
| 4T | Ae | Af | Ag | Ah |
| 5T | Ai | Aj | Ak | Al |
| >5T | Am | An | Ao | Ap |

FIG.17B

Recording compensation conditions
Last pulse end position table

|  | self-length of mark | | | |
|---|---|---|---|---|
|  | 3T | 4T | 5T | >5T |
| Length of space after mark 3T | Aq | Ar | As | At |
| 4T | Au | Av | Aw | Ax |
| 5T | Ay | Az | Ba | Bb |
| >5T | Bc | Bd | Be | Bf |

METHOD FOR RECORDING/ REPRODUCING DATA ON/FROM OPTICAL DISK

TECHNICAL FIELD

The present invention relates to a method for recording/ reproducing data on/from a rewritable optical disk using a mark edge recording method and a method for adjusting a waveform (write strategy) of a recoding pulse and recording compensation parameters for use in the data recording/ reproducing method.

BACKGROUND ART

DVD-RAM is one of the rewritable optical disk standards. An optical disk in a DVD-RAM format having a capacity of 2.6 GB per side is already commercially available. A DVD-RAM disk having an increased capacity of 4.7 GB is currently under development. A recording method for use with a phase change-type optical disk, which is employed in the 4.7 GB DVD-RAM format, is described with reference to FIG. 16.

FIG. 16(a) illustrates data 900 as an example of digital data to be recorded. The data 900 includes a High-level signal 901 of 11T (T denotes a recording clock cycle) and a Low-level signal 902 of 7T, and a High-level signal 903 of 3T. FIG. 16(b) illustrates a waveform of a recording pulse 910 of a laser beam, which corresponds to the data 900. FIG. 16(c) illustrates a recording state of amorphous marks 931 and 932 and a crystal space 933 which are formed on a recording track 934 of an optical disk according to the recording pulse 910.

In order to record the mark 931 and the space 933 which correspond to the data 900, portions of the recording track 934 in which marks are formed are irradiated with a laser beam as the recording pulse 910 which includes: a first pulse 911 having peak power 924; a multi-pulse 912 alternating between the peak power 924 and a third bias power 923 for each period of ½T; a last pulse 913 having the peak power 924; and a cooling pulse 914 having a second bias power 922. Further, the space 933 is irradiated with a laser beam which includes a pulse having a first bias power 921. A waveform of such a recording pulse 910 is generally referred to as "write strategy". In order to realize proper mark shapes for optical disk recording, the above-described four types of powers and temporal conditions for each of the above-described pulses are individually defined for each optical disk. Further, in order to optimize positions of edges of reproduced waveforms of marks, temporal conditions for a position of each edge of a recording pulse is adaptively controlled for each pattern of marks and spaces (reference document: Japanese Patent No. 2679596). FIGS. 17A and 17B respectively show a first pulse start position table and a last pulse end position table as recording compensation conditions of a 4.7 GB DVD-RAM format. That is, sixteen (4×4=16) types of temporal conditions are defined as start positions of the first pulse 911 for recording the mark 931 shown in FIG. 16(c) according to relationships between a space immediately before a mark and the mark itself with respect to the length, and sixteen (4×4=16) types of temporal conditions are defined as end positions of the last pulse 913 according to relationships between the mark itself and a space immediately after the mark with respect to the length. A procedure for obtaining these conditions is generally referred to as "recording compensation".

The above-described conventional DVD-RAM write strategy uses the multi-pulse 912 in which a single pulse corresponds to half the width of the recording clock cycle. In order to meet a demand for further increasing an access speed of an optical disk, it is conceivable that a frequency of a recording clock is increased. In this case, the recording clock cycle is inversely decreased, and therefore if a leading characteristic of a laser beam used for recording is not extremely fast, it is not easy to precisely generate the multi-pulse 912. There is a first problem that it is difficult to suppress the cost of elements used in an optical disk apparatus which requires an extremely fast laser drive circuit.

Further, there is a second problem that in the case of detecting and controlling laser power for each mark formation during a recording operation, if there is the multi-pulse 912, which switches fast, in the recording pulse 910, a waveform of the laser beam on the power monitor greatly fluctuates at portions of the multi-pulse 912, thereby requiring a complicated process circuit.

Furthermore, in order to meet a demand for an increase in capacity of the optical disk, it is conceivable that smaller marks are recorded at a high density. There is a third problem that in the case of using a mark edge recording method so as to perform a recording operation at higher density, if the amplitude of a reproduced signal of a shortest mark becomes extremely smaller than those of the other longer marks, the signal is buried in noise so that reproduction error of the optical disk might occur.

Further still, in the case where only the positions of edges of the recording pulse 910 are changed so as to properly position the edges of the reproduced signal, even if recording compensation is achieved, recording power is biased, and therefore there is a possibility that the shapes of the marks might be distorted. In particular, in the case where sizes of front and rear edges of a mark are different, the amplitude of the reproduced signal of the mark are illbalanced at the front and rear edges of the mark, and therefore errors may occur when digitizing the reproduced signal. There is a fourth problem that even if a multi-value detection means is used for the purpose of reducing errors, satisfactory effects cannot be achieved due to distortion of the shape of the mark.

Further, there are a number of parameters for recording compensation conditions, and therefore a procedure of the recording compensation becomes a complicated and time-consuming task. Therefore, there is a fifth problem that in the case where an automatic recording compensation means is included in the optical disk apparatus, it is difficult to shorten the period of time required to calculate all the parameters.

The present invention solves the above-described first through fifth problems and an objective thereof is to provide: a method for adjusting a recording pulse and write strategy for use in a mark edge recording method, which does not require a multi-pulse having a width thinner than that of a recording clock cycle and can increase an amplitude of a reproduced signal of a shortest mark and reduce distortion in the shape of a reproduced signal of a long mark, thereby reducing the number of recording compensation parameters as compared to conventional methods; and a method for recording/reproducing data on/from a rewritable optical disk using such an adjustment method and write strategy.

DISCLOSURE OF THE INVENTION

A method for adjusting a recording pulse for recording a mark on an optical disk according to the present invention includes the steps of: (a) adjusting a first recording pulse for recording a shortest mark; and (b) adjusting a second recording pulse for recording a long mark, wherein the first recording pulse is a single pulse having a first power, the second recording pulse is a two-stage pulse including a first-part pulse having a second power and a second-part pulse having a third power, the step (a) includes the steps of: (a1) fixing a position of a rear edge of the first recording pulse so as to satisfy a prescribed relative relationship with a first edge of a recording clock; (a2) determining the first power so as to properly position a rear edge of a reproduced waveform of the shortest mark; and (a3) determining a position of a front edge of the first recording pulse based on a length of a space immediately before the shortest mark so as to properly position a front edge of the reproduced waveform of the shortest mark, and the step (b) includes the steps of: (b1) fixing a position of a rear edge of the first-part pulse so as to satisfy the prescribed relative relationship with a second edge of the recording clock; (b2) fixing a position of a rear edge of the second-part pulse so as to satisfy the prescribed relative relationship with a third edge of the recording clock; (b3) determining the second power; (b4) determining the third power so as to properly position a rear edge of a reproduced waveform of the long mark; and (b5) determining a position of a front edge of the first-part pulse based on a length of a space immediately before the long mark and a length of the long mark so as to properly position a front edge of a reproduced waveform of the long mark, thereby achieving the above-described objective.

A combination of the first power and the position of the front edge of the first recording pulse may be set so as to be a combination which substantially maximizes a reproduction amplitude of the shortest mark among a plurality combinations which realize proper positions of the front and rear edges of the reproduced waveform of the shortest mark.

A combination of the second and third powers and the position of the front edge of the first-part pulse may be set so as to be a combination which substantially flattens a reproduction amplitude of the long mark among a plurality combinations which realize proper positions of the front and rear edges of the reproduced waveform of the long mark.

The first and second powers may be equivalent to each other.

A position of the rear edge of the second-part pulse may be fixed so as to be located behind the rear edge of the first-part pulse by a prescribed clock cycle.

A method for recording a mark on an optical disk according to the present invention uses the above-described method for adjusting a recording pulse and includes the steps of: recording the shortest mark based on the first recording pulse which is at least adjusted according to the step (a); and recording the long mark based on the second recording pulse which is at least adjusted according to the step (b), thereby achieving the above-described objective.

A method for recording a mark on an optical disk according to the present invention includes the steps of: (a) adjusting, based on a length of a space immediately before a shortest mark, a front edge of a first recording pulse for recording the shortest mark which is a single pulse in which a position of a rear edge and power are fixed; (b) recording the shortest mark using the first recording pulse adjusted at the step (a); (c) adjusting, based on a length of a space immediately before a long mark, a front edge of a second recording pulse for recording the long mark having a prescribed length which is a two-stage pulse including a first-part and second-part pulses having different powers from each other and in which positions of respective rear edges and respective powers of the first-part and second-part pulses are fixed; and (d) recording the long mark using the second recording pulse adjusted at the step (c), thereby achieving the above-described objective.

A method for adjusting a recording pulse for recording a mark and a space on an optical disk according to the present invention includes the steps of: (a) adjusting a first recording pulse for recording a shortest mark; (b) adjusting a second recording pulse for recording a long mark; and (c) adjusting a third recording pulse for recording a space between marks, wherein the first recording pulse is a single pulse having a first power, the second recording pulse is a two-stage pulse including a first-part pulse having a second power and a second-part pulse having a third power, the third recording pulse is a single pulse having a fourth power, the step (a) includes the steps of: (a1) fixing a position of a rear edge of the first recording pulse so as to satisfy a prescribed relative relationship with a first edge of a recording clock; (a2) determining the first power so as to properly position a rear edge of a reproduced waveform of the shortest mark; and (a3) determining a position of a front edge of the first recording pulse so as to properly position a front edge of the reproduced waveform of the shortest mark, the step (b) includes the steps of: (b1) fixing a position of a rear edge of the first-part pulse so as to satisfy the prescribed relative relationship with a second edge of the recording clock; (b2) determining the second power; (b3) determining a position of a rear edge and the third power of the second-part pulse based on a length of the long mark so as to properly position a rear edge of a reproduced waveform of the long mark; and (b4) determining a position of a front edge of the first-part pulse based on the length of the long mark so as to properly position a front edge of the reproduced waveform of the long mark, and the step (c) includes the step of (c1) determining the fourth power based on a length of the space so as to eliminate positional fluctuations of an edge of a reproduced waveform of a mark due to heat interference between marks, thereby achieving the above-described objective.

A combination of the first power and the position of the front edge of the first recording pulse may be set so as to be a combination which substantially maximizes a reproduction amplitude of the shortest mark among a plurality combinations which realize proper positions of the front and rear edges of the reproduced waveform of the shortest mark.

A combination of the second and third powers and the position of the front edge of the first-part pulse may be set so as to be a combination which substantially flattens a reproduction amplitude of the long mark among a plurality combinations which realize proper positions of the front and rear edges of the reproduced waveform of the long mark.

The first and second powers may be equivalent to each other.

A method for recording a mark on an optical disk according to the present invention uses the above-described method for adjusting a recording pulse and includes the steps of: recording the shortest mark based on the first recording pulse which is at least adjusted according to the step (a); recording the long mark based on the second recording pulse which is at least adjusted according to the step (b); and recording the space based on the third recording pulse which is at least adjusted according to the step (c), thereby achieving the above-described objective.

A method for recording a space between marks on an optical disk according to the present invention includes the steps of: (a) adjusting a power of a recording pulse which is a single pulse for recording a space based on a length of the space so as to eliminate positional fluctuations of an edge of a reproduced waveform of a mark due to heat interference between marks; and (b) recording the space using the recording pulse adjusted at the step (a), thereby achieving the above-described objective.

BRIEF DESCRIPTION OF THE DRAWINGS

FIG. 4A is a table showing recording compensation conditions of a method for recording/reproducing data on/from an optical disk according to an embodiment of the present invention.

FIG. 4B is a table showing recording other compensation conditions of a method for recording/reproducing data on/from an optical disk according to an embodiment of the present invention.

FIG. 4C is a table showing still other recording compensation conditions of a method for recording/reproducing data on/from an optical disk according to an embodiment of the present invention.

FIG. 4D is a table showing still other recording compensation conditions of a method for recording/reproducing data on/from an optical disk according to an embodiment of the present invention.

FIG. 17A is a table showing recording compensation conditions of a conventional method for recording/reproducing data on/from an optical disk.

FIG. 17B is a table showing recording other compensation conditions of the conventional method for recording/reproducing data on/from an optical disk.

BEST MODE FOR CARRYING OUT THE INVENTION

Figure 3:
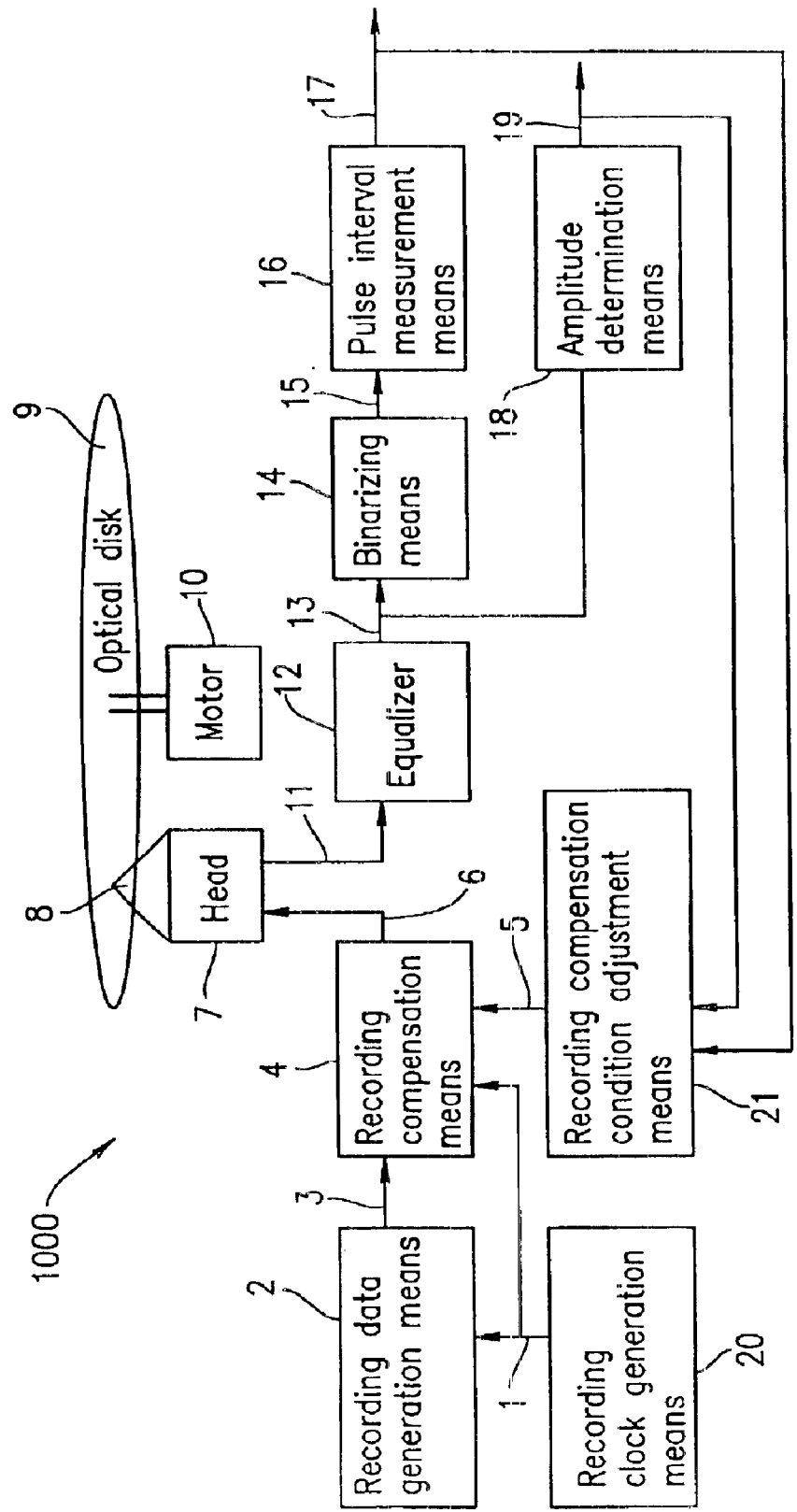
FIG. 3 is a diagram illustrating an optical disk data recording/reproducing apparatus according to Embodiments of the present invention.

FIG. 3 is a diagram illustrating a recording/reproducing apparatus 1000 for use with an optical disk 9 which is described as an embodiment of the present invention. The recording/reproducing apparatus 1000 is commonly used in following Embodiments 1–3.

Firstly, each element of the recording/reproducing apparatus 1000 is described. As shown in FIG. 3, the recording/reproducing apparatus 1000 includes: a recording clock generation means 20 for generating a recording clock 1 which is used as an operational reference time axis of the recording/reproducing apparatus 1000; a recording data generation means 2 for generating information desired to be recorded on the optical disk 9 as recording data 3; a recording compensation condition adjustment means 21 for adjusting a recording compensation condition 5; a recording compensation means 4 for generating a recording pulse 6 for driving a laser (not shown) from the recording data 3; a head 7 for recording data by irradiating the optical disk 9 with a laser beam 8 subjected to intensity modulation; and a motor 10 for rotating the optical disk 9.

The recording clock 1 is output to the recording data generation means 2 and the recording compensation means 4. The format of the recording data 3 is a PWM signal in units of clock. In Embodiments of the present invention, the recording data 3 is modulation data having a minimum run-length limit of 3T (T denotes a recording clock cycle) and a maximum run-length limit of 11T but is not limited to such modulation data. The recording compensation condition adjustment means 21 adjusts and determines parameters of powers and positions of pulses for each of marks and spaces as the recording compensation condition 5 so as to perform a recording operation such that a High-level signal period and a Low-level signal period of the recording data 3 respectively correspond to a mark and a space on an optical disk. The recording compensation means 4 receives the recording clock 1, the recording data 3, and the recording compensation condition 5 and outputs the recording pulse 6 to the head 6. The recording clock generation means 20 and the recording compensation condition adjustment means 21 can be externally provided to the recording/reproducing apparatus 1000.

The optical disk 9 is formed such that a base material on which spiral tracks are formed is provided with a film such as a phase change film. Data can be written or rewritten on the optical disk 9 by forming marks and spaces thereon using heat caused by the irradiation of the laser beam 8.

The recording/reproducing apparatus 1000 further includes: an equalizer 12 for compensating for frequency characteristics of a reproduced signal 11 from the head 7, which are attenuated at an upper range of the frequency, so as to output an analog equalized reproduced signal 13; a binarizing means 14 for binarizing the equalized reproduced signal 13 at a slice level so as to output a digital binarized pulse 15; a pulse interval measurement means 16 for detecting leading or trailing edges of the binarized pulse 15 so as to measure an interval from one edge to another edge of the pulse and output a time measurement result 17; and an amplitude measurement means 18 for measuring amplitude information such as a size of the equalized reproduced signal 13 and symmetric properties of a waveform of the equalized reproduced signal 13 so as to output an amplitude measurement result 19. The time measurement result 17 and the amplitude measurement result 19 are input to the recording compensation condition adjustment means 21 to be used as data for adjusting parameters of powers and positions of pulses for each of marks and spaces, and adjusting the write strategy.

In a reproducing operation, the head 7 irradiates the optical disk 9 with the laser beam 8 as reproduction power and a detector (not shown) performs a photoelectric exchange on light reflected from marks and spaces recorded on the optical disk 9 so as to output the reflected light as the reproduced signal 11. The equalizer 12 may be, for example, a standard equalizer, which is a combination of a transversal filter and a Bessel low-pass filter, or a nonlinear equalizer, which is a combination of an amplitude limiter and the standard equalizer.

The binarizing means 14 may be, for example, a duty feedback binarizing circuit for outputting binarized pulses integral values of which are controlled so as to have constant slice levels or a binarizing circuit which performs a multi-value detection using a partial response method. The pulse interval measurement means 16 may be, for example, a time interval analyzer or an LSI circuit specialized for the recording/reproducing apparatus 1000. The amplitude measurement means 18 may be, for example, an oscilloscope or an LSI circuit specialized for the recording/reproducing apparatus 1000.

The method for recording/reproducing data on/from an optical disk according to the present invention is performed using the recording/reproducing apparatus 1000. Positions of edges and values of power of recording pulses described below are set as the recording compensation condition 5 in the recording compensation means 4 so as to record marks on the optical disk 9. A wave form of a reproduced signal of a mark is output as the equalized reproduced signal 13 and is observed by the amplitude measurement means 18. An edge of the reproduced signal of the mark is output as the binarized pulse 15 and is observed by the pulse interval measurement means 16. It should be noted that in the following description, a mark having a length of 3T and a space having a length of 4T are respectively abbreviated to 3Tm and 4Ts, for example.

(Embodiment 1)

Figure 1:
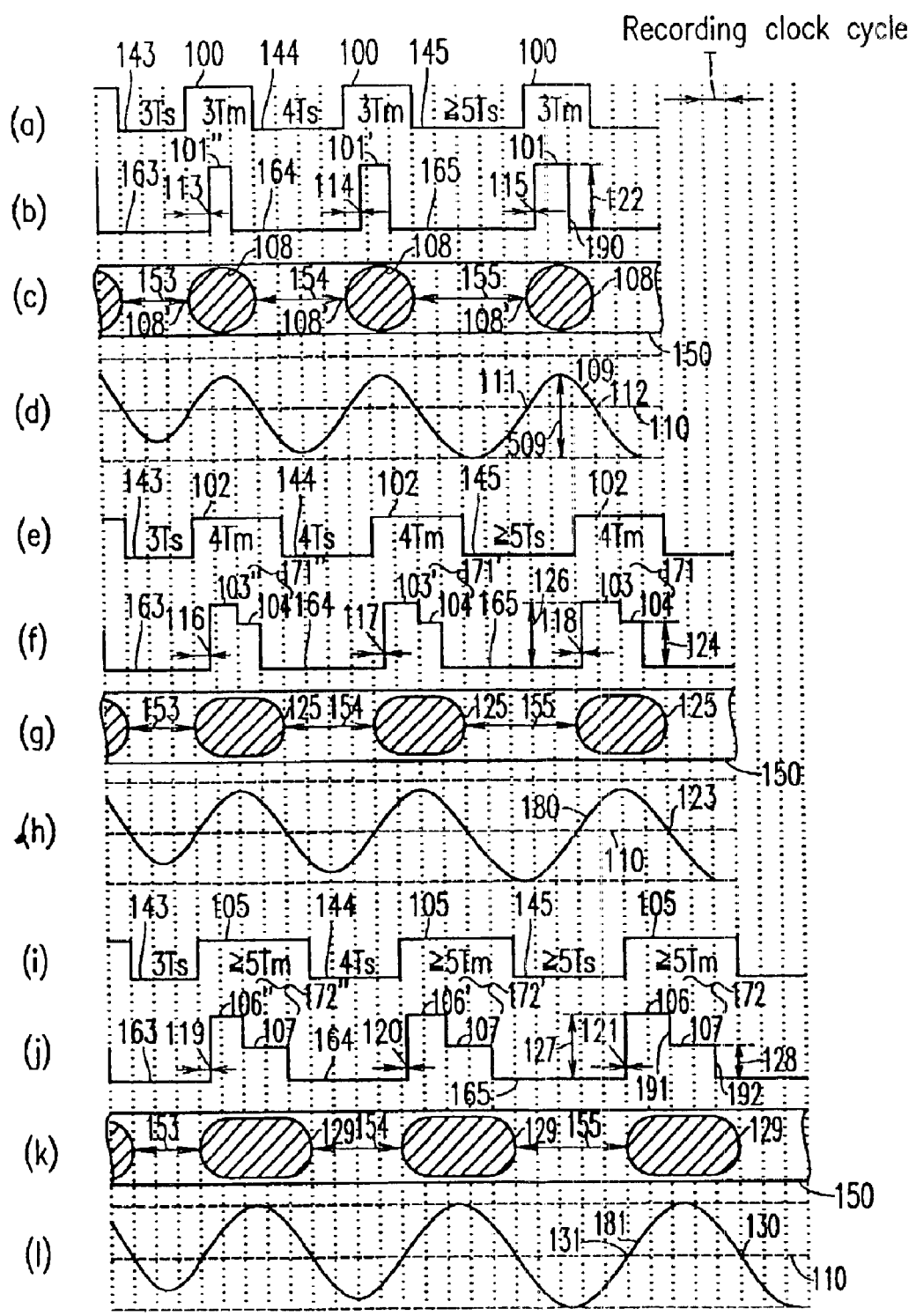
FIG. 1 is a diagram illustrating a method for recording/reproducing data on/from an optical disk according to Embodiment 1 of the present invention.

FIG. 1 is a diagram illustrating a method for recording/reproducing data on/from an optical disk and a method for adjusting a waveform (write strategy) and recording compensation parameters of a recording pulse for use in the data recording/reproducing method, which are described as Embodiment 1 of the present invention.

In FIG. 1, vertical dotted lines represent units of time and each division corresponds to one cycle T of the recording clock. From the top, FIG. 1(*a*) illustrates data in which a High-level signal 100 is allocated as a mark and Low-level signals 143, 144 and 145 are allocated as spaces, and illustrates a waveform of the recorded data 3 for use in the recording/reproducing apparatus 1000 of FIG. 3. The recorded data shown in FIG. 1(*a*) is formed of a series of the High-level signals 100 in the cases where lengths of spaces immediately before the shortest marks 108 of 3Tm are 3Ts, 4Ts and 5Ts or more.

FIG. 1(*b*) illustrates recording pulses 101, 101' and 101" corresponding to the High-level signals 100 each having a length of 3T and recording pulses 163, 164 and 165 respectively corresponding to the Low-level signals 143, 144 and 145. In FIG. 1(*b*), a vertical axis denotes a laser power, which is equivalent to intensity of the laser beam 8 modulated by the recording pulse 6 for use in the recording/reproducing apparatus 1000 of FIG. 3.

FIG. 1(*c*) is a schematic view illustrating the marks 108 and spaces 153, 154 and 155 recorded on a track 150 of the optical disk 9 by means of the laser beam 8. In FIG. 1(*c*), hatched areas represent the marks 108 and correspond to amorphous states of a phase change film, and the other areas represent the spaces 153, 154 and 155 and correspond to crystallized states of the phase change film.

FIG. 1(*d*) illustrates a solid line curve which is a waveform of the marks 108 and the spaces 153, 154 and 155, which are reproduced, and corresponds to the equalized reproduced signal 13 of FIG. 3. In FIG. 1(*d*), the upper and lower dotted lines denote an amplitude range of the reproduced signal, and a dashed line at the center denotes a slice level 110 for binarization. Similarly, FIGS. 1(*e*)–1(*h*) respectively illustrate recorded data, a recording pulse, recorded marks and an equalized reproduced signal in the case where long marks 125 of 4Tm are recorded/reproduced, and FIGS. 1(*i*)–1(*l*) respectively illustrate recorded data, a recording pulse, recorded marks and the equalized reproduced signal in the case where long marks 129 of 5Tm or more are recorded/reproduced. The recording/reproducing method according to Embodiment 1 is described step by step below.

<First Requirement>

In order to record the shortest marks 108 corresponding to the High-level signals 100 each having a length of 3T shown in FIG. 1(*a*), irradiation of the recording pulses 101, 101' or 101" which are single pulses shown in FIG. 1(*b*) is performed such that one of them corresponds to one of the shortest marks 108.

<Second Requirement>

In order to record marks which are longer than the shortest marks 108, for example, the long marks 125 corresponding to High-level signals 102 each having a length of 4T shown in FIG. 1(*e*), irradiation of recording pulses 171, 171' or 171" which are two-stage pulses shown in FIG. 1(*f*) is performed such that one of them corresponds to one of the long marks 125. The recording pulse 171 includes a first-part pulse 103 and a second-part pulse 104, the recording pulse 171' includes a first-part pulse 103' and a second-part pulse 104, and the recording pulse 171" includes a first-part pulse 103 and a second-part pulse 104.

Similarly, in order to record long marks of 5Tm or more, for example, the long marks 129 corresponding to the High-level signals 105 each having a length of 5T shown in FIG. 1(*i*), irradiation of recording pulses 172, 172' or 172" which are two-stage pulses shown in FIG. 1(*j*) is performed such that one of them corresponds to one of the long marks 129. The recording pulse 172 includes a first-part pulse 106 and a second-part pulse 107, the recording pulse 172' includes a first-part pulse 106' and a second-part pulse 107, and the recording pulse 172" includes a first-part pulse 106" and a second-part pulse 107.

Definition of edges of a reproduced waveform of a mark is now described. A front edge of the reproduced waveform of a mark means a leading edge of the binarized pulse 15 shown in FIG. 3. In the present embodiment shown in FIG. 1(*d*), the front edge refers to an intersection point 111 between the equalized reproduced signal 109 and the slice level 110 in the case where the shortest mark 108 is reproduced. A rear edge of the reproduced waveform of a mark means a trailing edge of the binarized pulse 15. In the present embodiment shown in FIG. 1(d), the rear edge refers to an intersection point 112 in the case where the shortest mark 108 is reproduced.

Next, what is referred to by the wording "edges of a reproduced waveform of a mark are properly positioned" is described. The edge of the reproduced waveform of a mark is as defined above, and the proper positions mean that all the intervals between the edges are multiples of a unit of the clock. For example, in FIG. 1, the proper position refers to a state where a position of an edge of a reproduced waveform of a mark is precisely overlapped with the vertical dotted line. When the edge of the reproduced waveform of a mark is properly positioned, a waveform of the binarized pulse 15 is identical to a waveform of recorded data (e.g., a waveform of the recorded data shown in FIG. 1(a)).

It should be noted that in order to properly position the edge of the reproduced waveform of a mark, the position of the edge of the recorded mark itself is not always required to correspond to a unit of the clock, the position of the edge of the reproduced binarized pulse signal is only required to be in a proper position in consequence. For example, only an interval between the front and rear edges of the High-level signal 100 having a length of 3T is required to be identical to an interval between the intersection points 111 and 112 (i.e., a length between the intersection points 111 and 112 is 3T).

<Third Requirement>

In order to properly position a front edge of a reproduced waveform of a mark, the position of the front edge of a recording pulse is determined based on a relationship between a length of a space immediately before the mark and a length of the mark itself. For example, as shown in FIG. 1(b), the positions of the front edges of the recording pulses 101", 101' and 101 of 3Tm are differently determined such that the front edge of the recording pulse 101" corresponding to a space immediately before a mark to be formed, which is 3Ts, is located at position 113, the front edge of the recording pulse 101' corresponding to a space immediately before a mark to be formed, which is 4Ts, is located at position 114, and the front edge of the recording pulse 101 corresponding to a space immediately before a mark to be formed, which is 5Ts or more, is located at position 115.

When the space immediately before a mark is small, heat generated by recording one mark before the mark conducts via the space so that a temperature of the mark to be formed fluctuates, thereby causing a phenomenon which shifts a position of the front edge of the mark to be formed. This is generally referred to as "heat interference". In order to cancel the heat interference so as to properly position a front edge of a reproduced waveform of the mark, the position of a front edge of a recording pulse is changed according to the length of the space immediately before the mark to be formed.

Similarly, in the case of the recording pulses of 4Tm, positions of front edges of recording pulses 171", 171' and 171 are determined so as to correspond to different values, such as positions 116, 117 and 118 shown in FIG. 1(f), each time a length of a space immediately before a mark to be formed varies. Similarly, in the case of recording pulses of 5Tm or more, positions of front edges of recording pulses 172, 172' and 172" are determined so as to correspond to different values, such as positions 119, 120 and 121 shown in FIG. 1(j), each time a length of a space immediately before the mark to be formed varies.

Further, in the case where lengths of marks are changed from 3Tm through 4Tm to 5Tm, even if lengths of spaces immediately before the respective marks are equivalent to one another, front edges of recording pulses are required to be changed. When a length of a mark itself is short, the size of the mark to be formed is small so that heat is radiated to the surroundings, and therefore the mark is rapidly cooled. On the contrary, when the length of the mark itself is long, heat is inefficiently radiated from the second-part of the mark which is continuously recorded, and therefore the mark is slowly cooled.

Accordingly, due to a difference between their self-lengths of the marks to be recorded, there arises a phenomenon that even when positions of front edges of recording pulses are equivalent to one another, positions (e.g., the positions 108' shown in FIG. 1(c)) of front edges of the marks to be formed are different. This is referred to as "heat nonlinearity" which depends on the lengths of the marks. In order to cancel the heat nonlinearity so as to properly position front edges of reproduced waveforms of the marks, even in the case where their respective spaces immediately before the marks to be formed have the same lengths of 3T, when the marks to be formed have lengths of 3Tm, 4Tm and 5Tm or more, respectively, the positions of the front edges of the recording pulses are changed so as to be correspondingly located at position 113 shown in FIG. 1(b), position 116 shown in FIG. 1(f) and position 119 shown in FIG. 1(j).

Consequently, as shown in FIG. 4A, conditions of the positions of the front edges of the recording pulses for properly positioning the front edges of the reproduced waveform of the marks used as two-dimensional parameters determined based on relationships between lengths of spaces immediately before marks and self-lengths of the marks. The numbers shown in a table of FIG. 4A correspond to reference numerals each denoting a position of an element illustrated in FIG. 1. With respect to positions of the elements corresponding to the reference numerals shown in the table, intervals between spaces immediately before marks and front edges of recording pulses provided by irradiation for forming the corresponding marks do not always have different values, some positions are provided with identical values depending on recording film characteristics of an optical disk and equalizer characteristics.

<Fourth Requirement>

Positions of respective rear edges of recording pulses corresponding to all the lengths of marks are separately fixed such that a specific relative positional relationship is satisfied with respect to a corresponding one of the recording clocks. In the example shown in FIG. 1, the positions of the rear edges of all the recording pulses are required to match with a corresponding one of edges of the recording clocks.

<Fifth Requirement>

Figure 5:
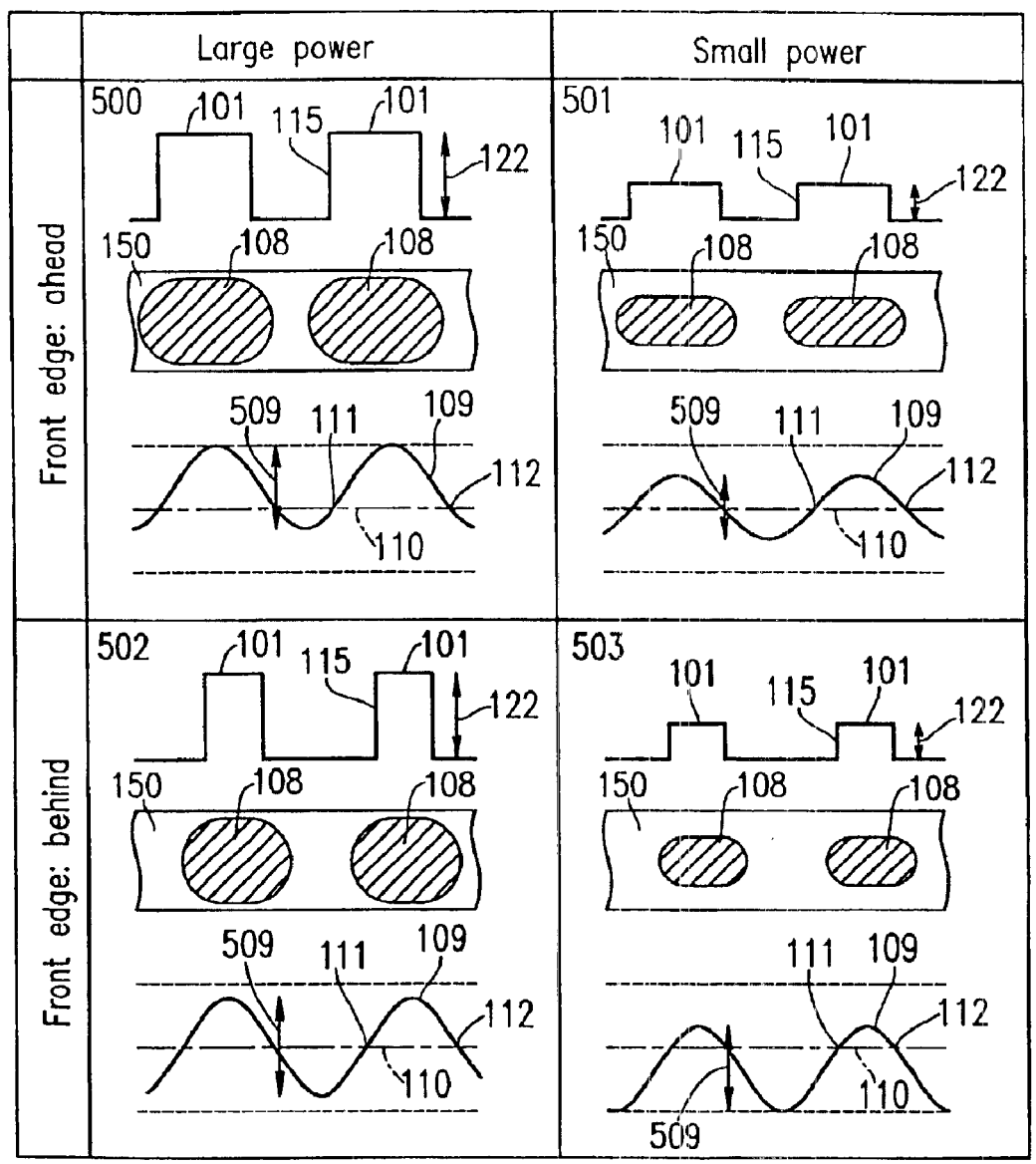
FIG. 5 is a diagram illustrating a method for recording/reproducing a shortest mark according to Embodiment 1 of the present invention.

In order to properly position a rear edge of a reproduced waveform of the shortest mark 108 (e.g., at the intersection point 112), the power of the recording pulse 101 which is a single pulse is changed. A method for achieving this is described using FIG. 5. FIG. 5 shows relationships between the marks 108 and their respective equalized reproduced signals 109 with respect to the case of recording the shortest marks 108 when the power 122 of the front edges of the recording pulse 101 and the positions 115 are changed under four types of conditions. In recording conditions 500, 501, 502 and 503 shown in FIG. 5, upper parts, middle parts and lower parts respectively illustrate wave forms of the recording pulse 101, respective shapes of the recording track 150 and the shortest marks 108, and waveforms of the equalized reproduced signals 109.

Comparing the recording conditions 500 and 501 of FIG. 5, in the recording condition 500, power 122 is large and in the recording condition 501, the power 122 is relatively small. By changing the large power 122 so as to be smaller, a width of the shortest mark 108 to be formed becomes thinner, and therefore the reproduced signal is changed toward a direction along which a level thereof is decreased. In this comparison example, the recording condition 501 in which an edge interval (a width between the intersection points 111 and 112) of the equalized reproduced signal 109 which can be seen at the slice level 110 denoted by the dotted chain line is equal to a width of the recording pulse 101 is the proper recording power.

Further, comparing the recording conditions 502 and 503 of FIG. 5, the recording condition 502 has large power 122 and the recording condition 503 has relatively small power 122. By changing the small power 122 so as to be larger, a width of the shortest mark 108 becomes thicker, and therefore the equalized reproduced signal 109 is changed toward a direction along which a level thereof is increased. In this comparison example, the recording condition 502 in which the edge interval of the equalized reproduced signal 109 which can be seen at the slice level 110 is equal to the width of the recording pulse 101 is the proper recording power. That is, in a recording method using the recording pulse of the shortest mark 108, which is a single pulse, it is possible to control the position of the edge of a reproduced waveform of a mark by changing the power of the recording pulse.

Furthermore, comparing the recording conditions 501 and 502, in the recording condition 501, the power 122 is small and the position 115 of the front edge of the recording pulse 101 is located ahead of its proper position. Relatively, in the recording condition 502, the power 122 is large and the position 115 of the front edge of the recording pulse 101 is located behind its proper position. Although the shapes of the marks 108 in the recording conditions 501 and 502 are different from each other with respect to the width and length, in both cases, the equalized reproduced signal 109 is obtained such that the edges of the reproduced waveform of the shortest mark 108 are properly positioned as described above. However, in the recording condition 502, a ratio of the shortest mark 108 to the track 150 with respect to an area is large as compared to the recording condition 501, and therefore reproduction amplitude 509 of the equalized reproduced signal 109 is larger. Even if the same positions of the edges of the reproduced waveform can be realized, when the reproduction amplitude 509 of the equalized reproduced signal 109 is large, the leading edge becomes steep so that time axis fluctuations (jitter) are small. The shortest mark 108 has a tendency to have a small reproduction amplitude 509 as compared to the other longer marks (e.g., the long marks 125), and therefore satisfactory quality is hard to obtain.

Accordingly, with respect to the power 122 and the position 115 of the front edge of the recording pulse 101 for recoding the shortest mark 108, it is preferable to select the conditions under which the reproduction amplitude 509 is the largest, although there are a plurality of combinations which realize the proper positions of the edges (i.e., the positions of the intersection points 111 and 112) of the reproduced waveform of the shortest mark 108 (as in the cases of the recording conditions 501 and 502). In the combination of the recording power 122 and the positions 113, 114 and 115 of the front edges in the case of 3Tm of FIG. 1(b), as described above, the positions of the edges (i.e., the positions of the intersection points 111 and 112) of the reproduced waveform are proper and the conditions under which the reproduction amplitude 509 is the largest.
<Sixth Requirement>

Figure 6:
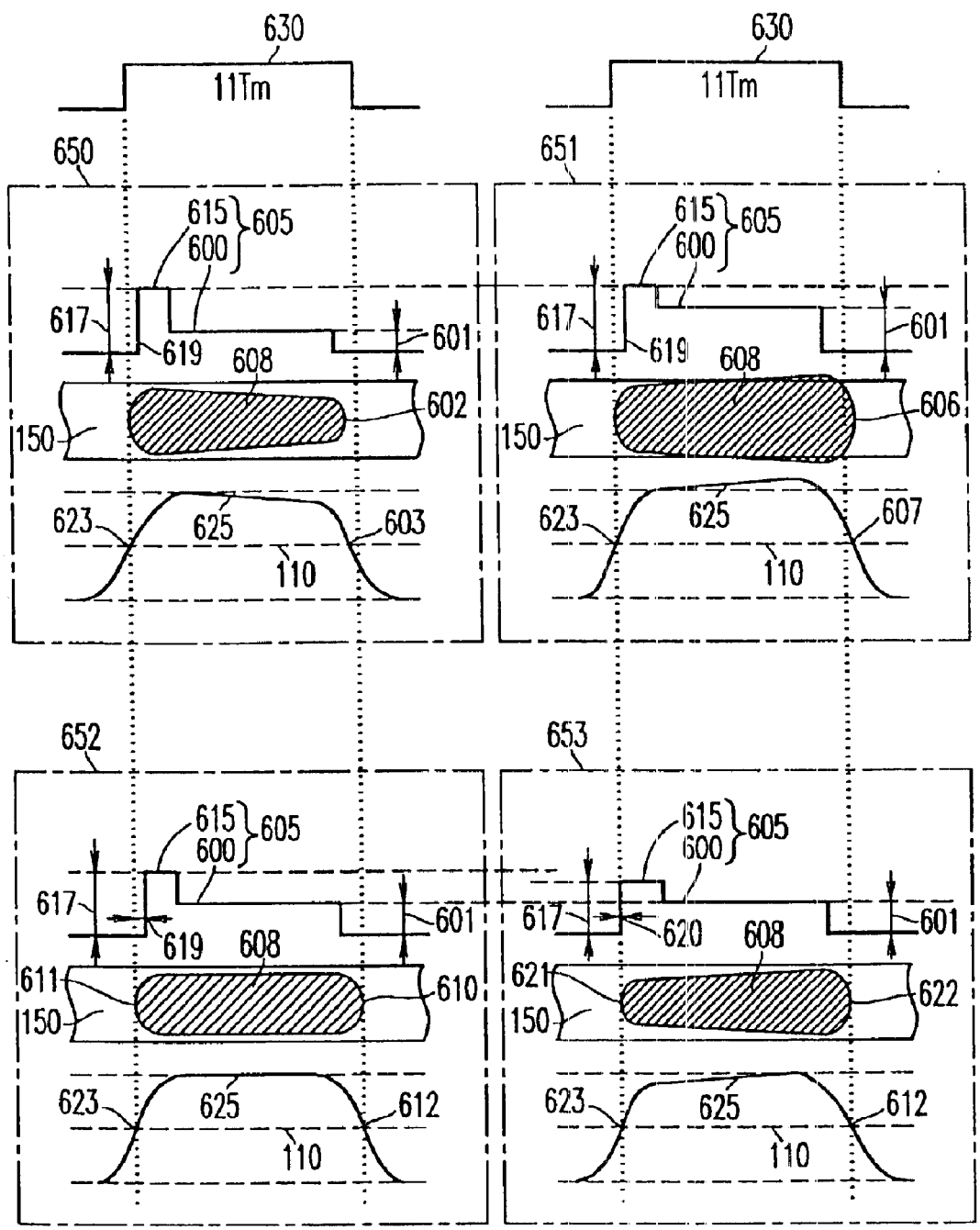
FIG. 6 is a diagram illustrating a method for recording/reproducing a long mark according to Embodiment 1 of the present invention.

In order to properly position a rear edge of a reproduced waveform of a long mark, the power of a second-part pulse of the recording pulse is changed according to the length of the long mark. A method for achieving this is described using FIG. 6. FIG. 6 shows relationships among a High-level signal 630 corresponding to 11Tm, a recording pulse 605, the shape of a long mark 608 and an equalized reproduced signal 625 included in recording data for recording a long mark 608 of 11Tm under each of recording conditions 650, 651, 652 and 653. In the recording conditions 650, 651, 652 and 653 shown in FIG. 6, upper parts, middle parts and lower parts respectively illustrate waveforms of the recording pulse 605, respective shapes of the recording tracks 150 and the long marks 608, and waveforms of the equalized reproduced signals 625. The recording pulse 605 includes a first-part pulse 615 and a second-part pulse 600.

In the recording condition 650, since power 601 of the second-part pulse 600 is small, a rear edge 602 of the long mark 608 to be formed is thin and short, and therefore a position 603 of a rear edge of a reproduced waveform of the long mark 608 is provided ahead of its proper position.

In the recording condition 651, since the power 601 of the second-part pulse 600 is large, a rear edge 606 of the long mark 608 to be formed becomes thick and long due to heat storage effects, and therefore a position 607 of a rear edge of a reproduced waveform of the equalized reproduced signal 625 of the long mark 608 is provided behind its proper position.

On the contrary, in the recording condition 652, since the power 601 of the second-part pulse 600 has a proper value, a rear edge 610 of the long mark 608 to be formed has a same width as that of a front edge 611 of the long mark 608 and a proper length, and therefore a position 612 of a rear edge of a reproduced waveform of the equalized reproduced signal 625 of the long mark 608 corresponds to its proper position. That is, in the recording method in which the recording pulse 605 is formed of the first-part pulse 615 and the second-part pulse 600, by changing the power 601 of the second-part pulse 600, it is possible to control the position of the rear edge of the reproduced waveform of the equalized reproduced signal 625 of the long mark 608.

Further, in the recording condition 653, although the power 601 of the second-part pulse 600 has a proper value, a value of power 617 of the first-part pulse 615 is lower than a proper value of the power 617 shown with respect to the recording condition 652, and therefore by adjusting a position 620 of the front edge so as to be temporally ahead of a proper edge position 619 shown with respect to the recording condition 652, both a position 623 of the front edge and a position 612 of the rear edge of the reproduced waveform of the equalized reproduced signal 625 are properly obtained.

However, heat unbalance is caused between the front edge 621 and the rear edge 622 of the long mark 608 so that widths of the front and rear edges 621 and 622 are caused to be different. As a result, the reproduced waveform of the equalized reproduced signal 625 of the long mark 608 is not flattened but inclined. In the case where originally flattened portions of the equalized reproduced signal 625 are inclined (distorted), even if a multi-value detection method such as a partial response method is used so as to enhance the performance when binarizing the equalized reproduced signal 625, expected performance cannot be achieved, thereby causing a malfunction in which errors might be caused.

Accordingly, with respect to the power and the position of the front edge of the first-part pulse as well as the power and the position of the rear edge of the second-part pulse, in the case of recording a long mark, it is preferable to select the conditions under which the reproduction amplitudes of the front and rear edges of the long mark are equivalent to each other (i.e., the reproduced waveform is flattened), although there are a plurality of combinations which realize the proper positions of the edges of the reproduced waveform of the long mark (as in the cases of the recording conditions shown as the recording conditions 652 and 653 of FIG. 6).

Referring again to FIG. 1, similarly, in the case of recording the long marks 125 of 4Tm, power 124 of a second-part pulse 104 of FIG. 1(f) is determined so as to properly obtain a position 123 of a rear edge of a waveform of an equalized reproduced signal 180 of FIG. 1(h). Similarly, in the case of recording the long marks 129 of 5Tm or more, power 128 of a second-part pulse 107 of FIG. 1(j) is determined so as to properly obtain a position 130 of a rear edge of a waveform of an equalized reproduced signal 181 of FIG. 1(l). In these cases, a value of power 126 of first-part pulses 103, 103' and 103" of a recording pulse 171 can be different from that of power 127 of first-part pulses 106, 106' and 106" of a recording pulse 172. Further, a value of the power 128 of the second-part pulse 107 of the recording pulse 172 can be different from that of the power 124 of the second-part pulse 104 of the recording pulse 171.

Powers of second-part pulses of a recording pulse for properly positioning rear edges of reproduced waveforms of long marks are used as parameters which vary depending on lengths of the long marks. FIG. 4B shows conditions of power for each self-length of marks when the power of the first-part pulse of long marks is equivalent to that of single pulses of shortest marks. The numbers shown in a table of FIG. 4B correspond to respective powers of pulses shown in FIG. 1. It should be noted that an optical value of the power of a first-part pulse for each length of marks is not necessarily equivalent to those of the power of first-part pulses for lengths of other marks, and there are some cases where those values vary for each length of the marks depending on recording film characteristics of an optical disk and equalizer characteristics.

As described above, with the recording/reproducing method which satisfies the first through sixth requirements, all the marks from the shortest mark 108 to the longest mark 608 are recorded on an optical disk, thereby properly positioning edges of reproduced waveforms of marks. It should be noted that the first through sixth requirements are simply described in this order and may be reordered for implementation.

The method for recording/reproducing data on/from the optical disk according to the present embodiment does not use a pulse shorter than a recording clock cycle, such as a multi-pulse used in conventional methods, so as to record a long mark. Further, a reproduction amplitude of a reproduced waveform of the long mark can be flattened and the amplitude of a shortest mark can be maximized.

Furthermore, the present embodiment employs a method for adjusting a position of a rear edge of the reproduced waveform of the long mark by adjusting the power of a second-part pulse of a recording pulse. Therefore, there is only one positional condition of the rear edge of the recording pulse used for recording the shortest mark (i.e., the positional condition is fixed). Further, there is only one positional condition provided for each of the rear edges of the first-part pulse and the second-part pulse of the recording pulse for recording the long mark (i.e., each positional condition is fixed). Therefore, as compared to conventional recording methods, the recorded waveform (write strategy) is simplified and in addition to this, it is made possible to significantly reduce the number of recording compensation parameters.

A method for obtaining recording compensation conditions through a shortest procedure in test recording of marks and spaces and a method for recording/reproducing data are described with reference to FIGS. 1, 5, 6, 9, 10, 11 and 12. FIGS. 9, 10, 11 and 12 are flowcharts each showing a method for obtaining recording compensation conditions through a shortest procedure and a method for recording/reproducing data.

Figure 9:
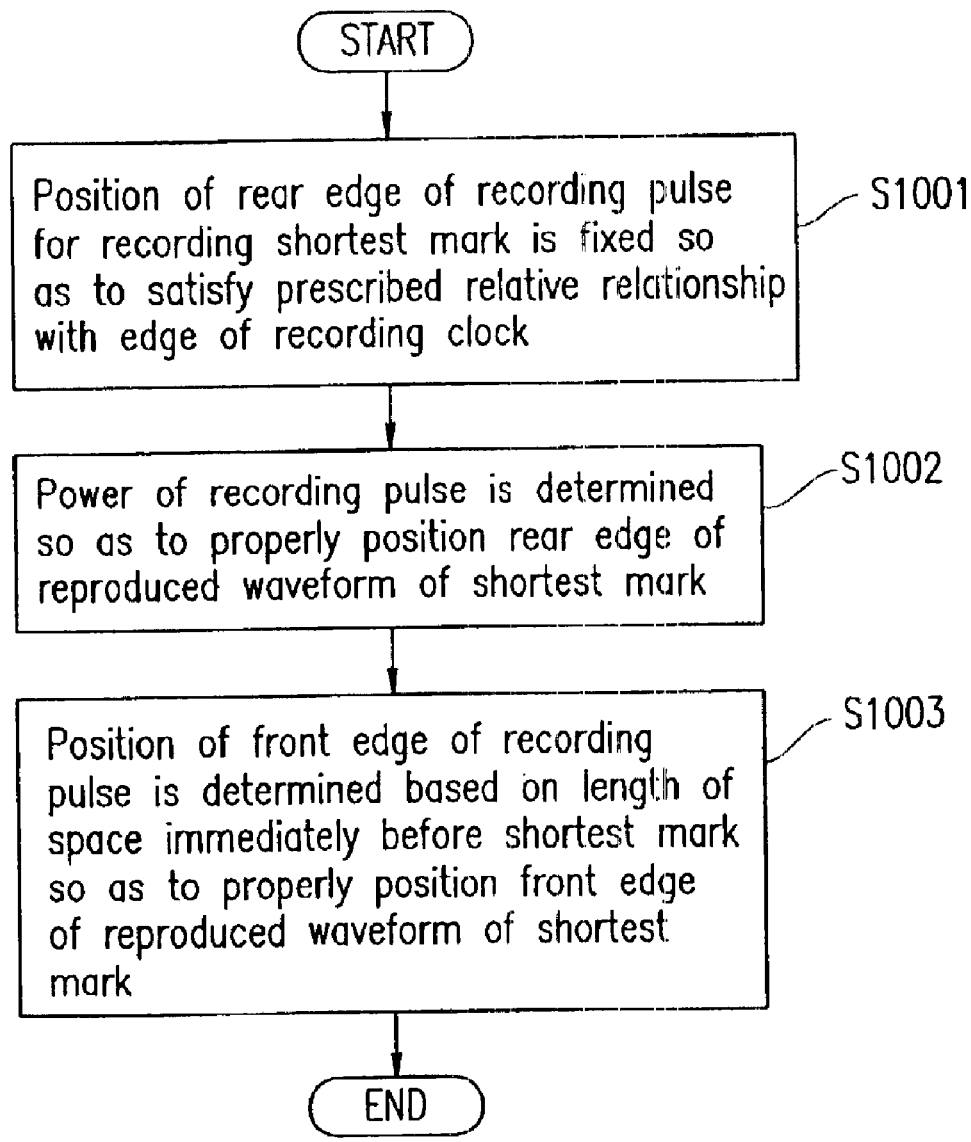
FIG. 9 is a flowchart showing a method for recording/reproducing data on/from an optical disk according to Embodiment 1 of the present invention.

Referring to FIGS. 1 and 9, the recording pulse 101 used for recording the shortest mark 108 is described. A position 190 of a rear edge of the recording pulse 101 is fixed so as to satisfy a prescribed relative relationship with an edge of a recording clock (S1001). Next, the power 122 of the recording pulse 101 is determined so as to properly position a rear edge of a reproduced waveform of the shortest mark 108 (i.e., at an intersection point 112) (S1002). Then, a position 115 of a front edge of the recording pulse 101 is determined based on a length (e.g., 5T) of a space located immediately before the shortest mark 108 so as to properly position a front edge of the reproduced waveform of the shortest mark 108 (i.e., at an intersection point 111) (S1003). The position 115 of the front edge of the recording pulse 101 can be adjusted to have a different value each time a length of the space located immediately before the mark varies.

It should be noted that, as described with reference to FIG. 5, a value of the power 122 of the recording pulse 101 is preferably determined so as to maximize the reproduction amplitude 509.

Figure 10:
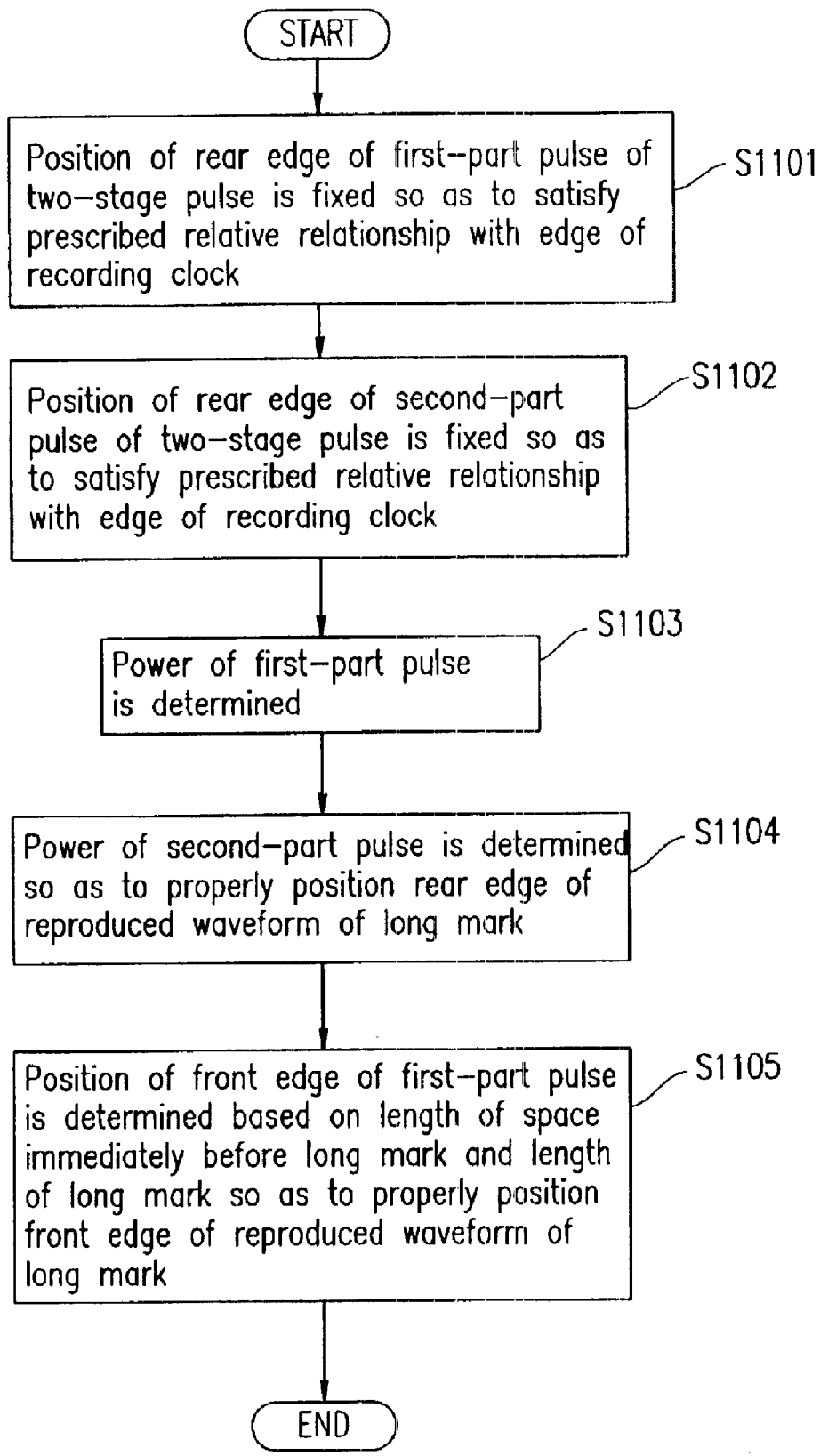
FIG. 10 is a flowchart showing another method for recording/reproducing data on/from an optical disk according to Embodiment 1 of the present invention.

Referring to FIGS. 1 and 10, the recording pulse 172 used for recording the long mark 129 is described. A position 191 of a rear edge of the first-part pulse 106 of the recording pulse 172 which is a two-stage pulse is fixed so as to satisfy a prescribed relative relationship with an edge of a recording clock (S1101). Next, a position 192 of a rear edge of the second-part pulse 107 of the recording pulse 172 is fixed so as to satisfy a prescribed relative relationship with an edge of a recording clock (S1102). For example, a position of a rear edge of a second-part pulse of a recording pulse for recording a long mark of nTm (n denotes an integer of four or more) is fixed at a position located backward from a position of a rear edge of a first-part pulse by a length of (n−3)T.

Then, the power 127 of the first-part pulse 106 is determined (S1103). The power 127 can be determined so as to have a value equivalent to that of the power 122 of the recording pulse 101. Then, the power 128 of the second-part pulse 107 is determined so as to properly position a rear edge of a reproduced waveform of the long mark 129 (i.e., at an intersection point 130) (S1104). It should be noted that, as described with reference to FIG. 6, in order to achieve the flatness of the reproduction amplitude of the long mark, a value of each of the powers 122, 126 and 127 can be different from those of one another or a value of each of the powers 124 and 128 can be different from that of each other.

Then, a position 121 of the front edge of the first-part pulse 106 is determined based on a length (e.g., 5T) of a space located immediately before the long mark 129 and a length (e.g., 5T) of the long mark 129 so as to properly position a front edge of the reproduced waveform of the long mark 129 (i.e., at an intersection point 131) (S1105). Since the recording pulses 101, 171 and 172 shown in FIG. 1 are different from one another with respect to a length of a mark to be recorded, lengths between the positions 115, 118 and 121 of the front edges and their respective rear edges are set such that positions of their respective rear edges are different from one another, even if lengths of spaces located immediately before the marks are identical to one another.

By repeatedly performing the procedures shown in FIGS. 9 and 10 with respect to various combinations of lengths of marks and spaces, all the recording compensation conditions for the shortest marks and long marks are determined in a shortest procedure. The order of the steps shown in FIGS. 9 and 10 is an example and the procedure is not limited to this order. The above is a method for obtaining the recording compensation conditions in a shortest procedure in a test recording.

Figure 11:
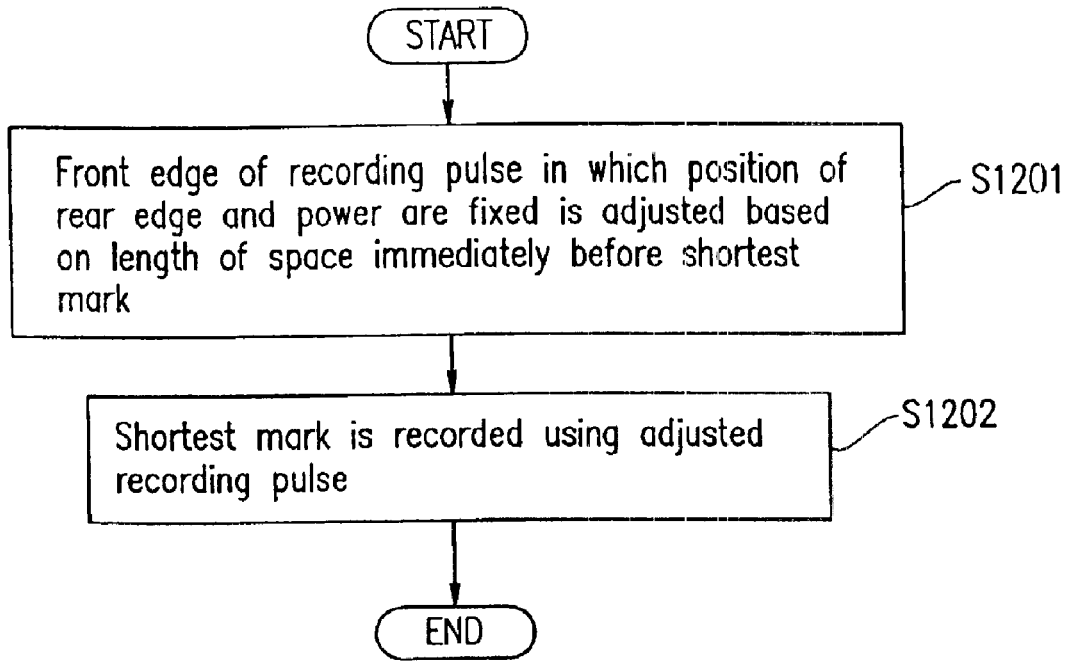
FIG. 11 is a flowchart showing still another method for recording/reproducing data on/from an optical disk according to Embodiment 1 of the present invention.
Figure 12:
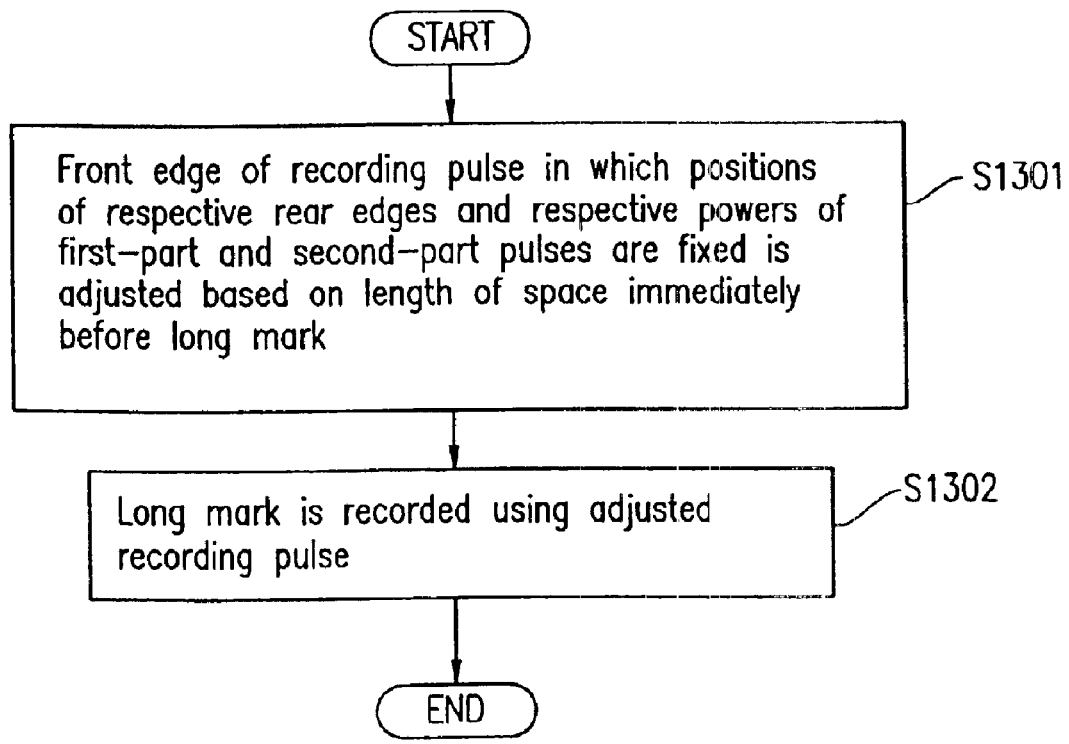
FIG. 12 is a flowchart showing still another method for recording/reproducing data on/from an optical disk according to Embodiment 1 of the present invention.

Referring to FIGS. 1, 11 and 12, a method for recording user data using the determined recording compensation conditions is described. After the recording compensation conditions are determined, the rear edge position 190 and the power 122 of the recording pulse 101 as a recording pulse used for recording the marks shown in FIG. 1 have fixed values. Adjustments of the position 115 of the front edge of the recording pulse 101 in an operation of recording the user data are performed by selecting a value of a proper position from the recording compensation conditions as shown in FIG. 4A (S1201). The shortest mark 108 can be recorded on an optical disk using the recording pulse 101 adjusted in this manner (S1202).

In a recording pulse, for example, the recording pulse 172 for recording the marks shown in FIG. 1 after the recording compensation conditions are determined, the position 191 of the rear edge and the power 127 of the first-part pulse 106 and the position 192 of the rear edge and the power 128 of the second-part pulse 107 have fixed values. Adjustments of the position 121 of the front edge of the recording pulse 172 in an operation of recording the user data are performed by selecting a value of a proper position from the recording compensation conditions as shown in FIG. 4A (S1301). The long mark 129 can be recorded on an optical disk using the recording pulse 172 adjusted in this manner (S1302).

As described above, in the present embodiment, since only an element of a prescribed recording pulse which is selected so as to be changed in the user data recording operation after the determination of the recording compensation conditions is the position of the front edge, a data process is readily performed, thereby increasing the speed of the data recording operation.

(Embodiment 2)

Figure 2:
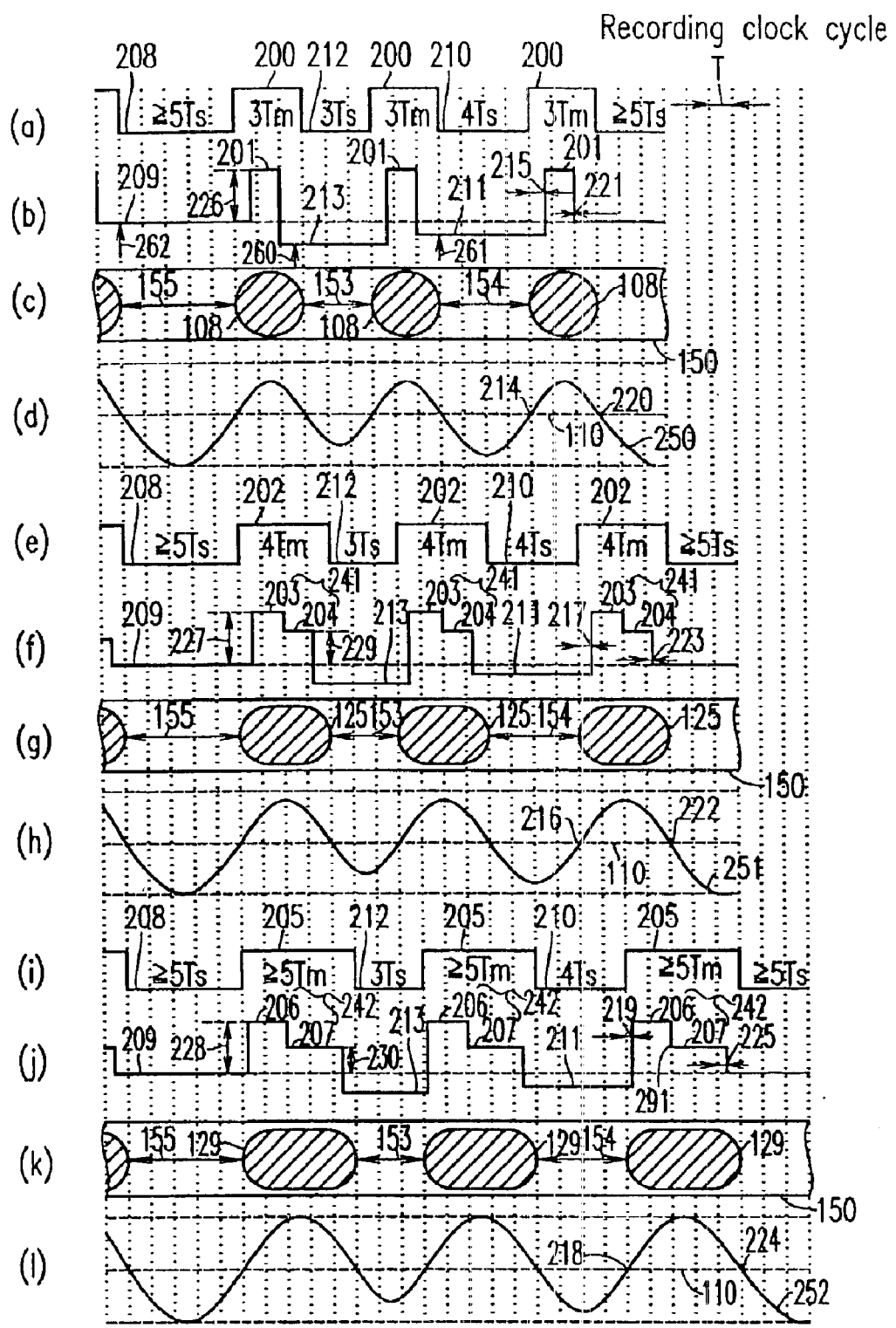
FIG. 2 is a diagram illustrating a method for recording/reproducing data on/from an optical disk according to Embodiment 2 of the present invention.

FIG. 2 is a diagram illustrating a method for recording/reproducing data on/from an optical disk and a method for adjusting the write strategy and recording compensation parameters of a recording pulse for use in the data recording/reproducing method, which are described as Embodiment 2 of the present invention. In the method illustrated in FIG. 2, same elements as those of Embodiment 1shown in FIG. 1 are denoted by same reference numerals, and therefore detailed description thereof is omitted.

FIGS. 2(a)–2(d) respectively illustrate recorded data, a recording pulse, recorded marks and an equalized reproduced signal in the case where shortest marks of 3Tm are recorded/reproduced. FIGS. 2(e)–2(h) respectively illustrate recorded data, a recording pulse, recorded marks and the equalized reproduced signal in the case where the long marks 125 of 4Tm are recorded/reproduced. FIGS. 2(i)–2(l) respectively illustrate recorded data, a recording pulse, recorded marks and the equalized reproduced signal in the case where the long marks 129 of 5Tm or more are recorded/reproduced.

The recording/reproducing method and the method for adjusting the write strategy and the recording compensation parameters according to Embodiment 2 are described below.

<First Requirement>

In order to record the shortest marks 108 corresponding to High-level signals 200 each having a length of 3T shown in FIG. 2(a), irradiation of the recording pulses 201 which are single pulses shown in FIG. 2(b) is performed such that one of them corresponds to one of the shortest marks 108.

<Second Requirement>

In order to record marks which are longer than the shortest marks 108, for example, the long marks 125 corresponding to High-level signals 202 each having a length of 4T shown in FIG. 2(e), irradiation of recording pulses 241 which are two-stage pulses shown in FIG. 2(f) is performed such that one of them corresponds to one of the long marks 125. Each recording pulse 241 includes a first-part pulse 203 and a second-part pulse 204.

In order to record long marks of 5Tm or more, for example, the long marks 129 corresponding to High-level signals 205 each having a length of 5T shown in FIG. 2(i), irradiation of recording pulses 242 which are two-stage pulses shown in FIG. 2(j) is performed such that one of them corresponds to one of the long marks 129. Each recording pulse 242 includes a first-part pulse 206 and a second-part pulse 207.

<Third Requirement>

Figure 7:
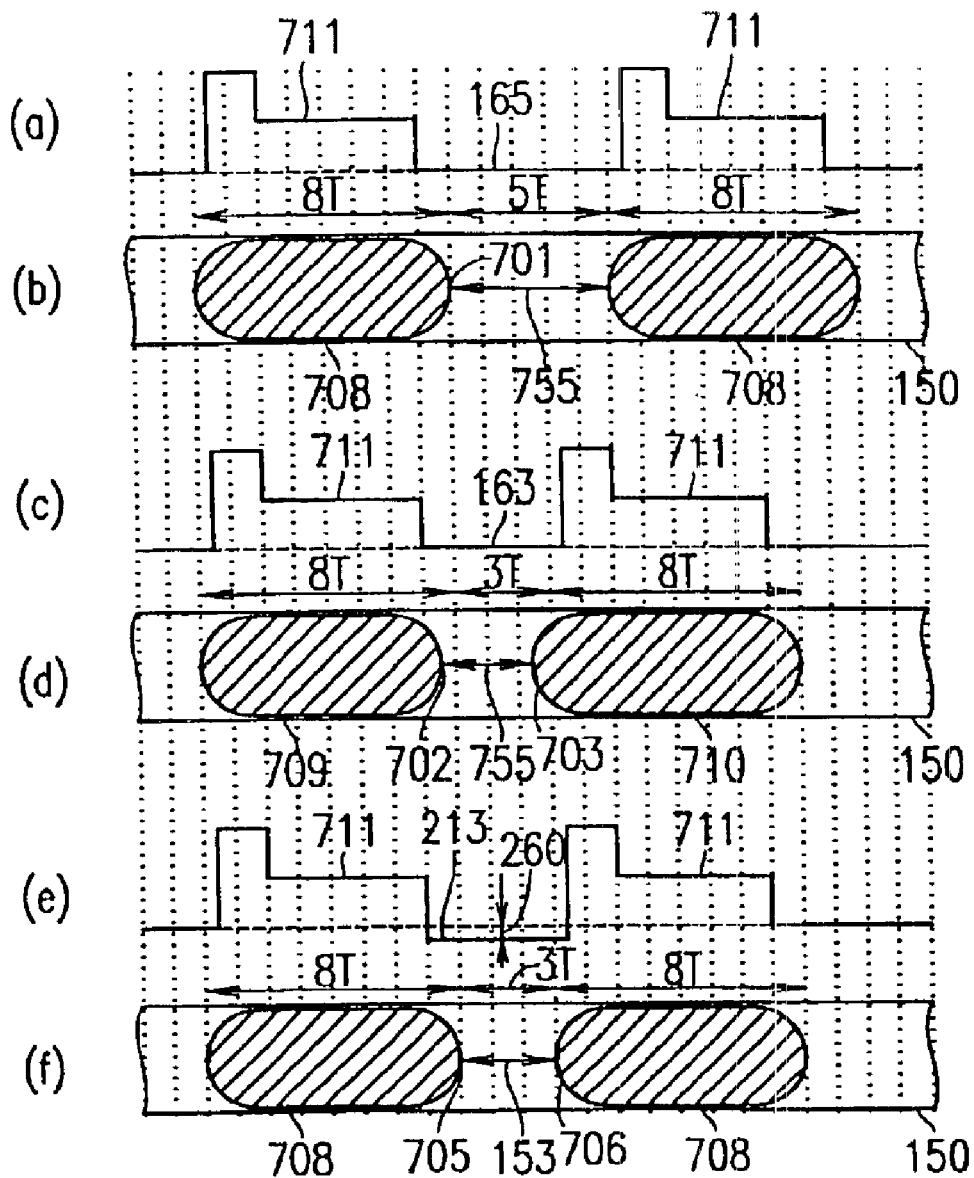
FIG. 7 is a diagram illustrating a recording method which controls heat interference between marks according to Embodiment 2 of the present invention.

Power of a recording pulse used for performing a recording operation between marks (i.e., recording a space) is changed each time a length of the space varies, so as to eliminate fluctuations of an edge of a reproduced waveform of a mark which are caused due to heat interference between the marks. A method for properly positioning an edge of a mark by reducing recording power for a space portion so as to prevent the heat interference between marks is described using FIG. 7. FIG. 7 illustrates three types of relationships between power of a waveform of a recording pulse corresponding to 8Tm and marks to be formed.

FIG. 7(a) illustrates recording pulses 711 and 145 in the case of recording long marks 708 of 8Tm and a space of 5Ts. FIG. 7(b) illustrates the long marks 708 and a space 755 recorded on an optical disk. In these cases, since a space between the marks is as large as 5Ts, heat interference does not occur, whereby rear edges 701 of the long marks 708 are formed so as to be properly positioned.

FIG. 7(c) illustrates recording pulses in the case of recording long marks 709 and 711 of 8Tm and a space of 3Ts. In this case, since a space between the marks is as small as 3Ts, heat interference occurs. As shown in FIG. 7(d), a rear edge 702 of the long mark 709 is slowly cooled due to heat interference of a front edge 703 of the long mark 710 which is recorded next, so that an amorphous mark is hard to be formed. Therefore, the position of the rear edge 702 is moved so as to be located temporally ahead of its proper position. Further, a temperature of the front edge 703 of the long mark 710 becomes higher due to an effect of remaining heat resulting from heat interference of the rear edge 702 of the previously-recorded long mark 709, thereby facilitating amorphous formation. Thus, the position of the front edge 703 is moved so as to be located temporally ahead of its proper position.

FIG. 7(e) illustrates recording pulses 711 and 213 in the case of reducing power 260 used for recording a space when a space between marks is small so as to prevent heat interference. In order to form a space of 3Ts, irradiation of the recording pulse 213 is performed while the power 260 is reduced so as to be lower than power of the recording pulses 165 and 163, and therefore although the space is short, heat interference between marks is cancelled, whereby as shown in FIG. 7(f), a rear edge 705 and a front edge 706 of the long mark 708 are properly positioned.

Referring to FIGS. 2(a) and 2(b), power 261 of a recording pulse 211 for recording a space 154 having a length of 4T corresponding to a Low-level signal 210 is set so as to be less than power 262 of a recording pulse 209 for recording a space 155 having a length of 5T or more which does not cause heat interference and corresponds to a Low-level signal 208. This eliminates the influence of heat interference between marks which is caused in the case where the powers 261 and 262 are equivalent to each other.

Power 260 of a recording pulse 213 for recording a space 153 having a length of 3T corresponding to a Low-level signal 212 is set so as to be less than the power 261. This, eliminates the influence of heat interference between marks which is caused in the case where the powers 260 and 262 are equivalent to each other.

That is, the influence of heat interference between marks is eliminated by determining power of a recording pulse for recording a space according to a length of each space. It should be noted that the recording power of the recording pulse for each length of a space does not depend on lengths of marks provided before and after the space and is fixed at a constant value.

<Fourth Requirement>

After determining power of a recording pulse for each length of a space, a position of a front edge of the recording pulse for recording a mark is determined for each length of the mark so as to properly position the position of the front edge of a reproduced waveform of the mark.

In FIG. 2, a position 215 of a front edge of the recording pulse 201 is determined so as to properly position a front edge of a reproduced waveform of the shortest mark 108 of 3Tm (i.e., at an intersection point 214 between the equalized reproduced signal 250 and the slice level 110). A position 217 of a front edge of a first-part pulse 203 of the recording pulse 241 is determined so as to properly position a front edge of a reproduced waveform of the long mark 125 of 4Tm (i.e., at an intersection point 216 between the equalized reproduced signal 251 and the slice level 110). A position 219 of a front edge of a first-part pulse 206 of the recording pulse 242 is determined so as to properly position a front edge of a reproduced waveform of a long mark of 5Tm or more (i.e., at an intersection point 218 between the equalized reproduced signal 252 and the slice level 110).

<Fifth Requirement>

Similar to the above-described case, after determining power of a recording pulse for each length of a space, a position of a rear edge of the recording pulse for recording a mark is determined for each length of the mark so as to properly position the position of the rear edge of a reproduced waveform of the mark.

In FIG. 2, a position 221 of a rear edge of the recording pulse 201 is determined so as to properly position a rear edge of the reproduced waveform of the shortest mark 108 of 3Tm (i.e., at an intersection point 220 between the equalized reproduced signal 250 and the slice level 110). A position 223 of a rear edge of a second-part pulse 204 of the recording pulse 241 is determined so as to properly position a rear edge of the reproduced waveform of the long mark 125 of 4Tm (i.e., at an intersection point 222 between the equalized reproduced signal 251 and the slice level 110). A position 225 of a rear edge of a second-part pulse 207 of the recording pulse 242 is determined so as to properly position a rear edge of the reproduced waveform of the long mark 129 of 5Tm or more (i.e., at an intersection point 224 between the equalized reproduced signal 252 and the slice level 110).

FIG. 4C shows positional conditions of edges of a recording pulse. The numbers shown in a table of FIG. 4C correspond to respective positions of the elements shown in FIG. 2. It should be noted that positions of the elements corresponding to their respective reference numerals shown in the Table do not always have different values, some positions are provided with identical values depending on recording film characteristics of an optical disk and equalizer characteristics.

As in the case of Embodiment 1, in the present embodiment, with respect to the positions of the front and rear edges of the power which is a single pulse for recording a shortest mark, it is preferable to select the condition under which a reproduction amplitude is the largest, although there are a plurality of combinations which realize the proper positions of the edges of the reproduced waveform of the shortest mark.

Further, with respect to power and the position of a front edge of a first-part pulse and power and the position of a rear edge of a second-part pulse, in the case of recording a long mark, it is preferable to select the condition under which the reproduction amplitude of the front and rear edges of the long mark are equivalent (i.e., the reproduced waveform is flattened), although there are a plurality of combinations which realize the proper positions of the edges of the reproduced waveform of the long mark.

FIG. 4D shows conditions of power of a recording pulse with respect to a case where the power 227 of the first-part pulse 203 of the recording pulse 241 and the power 228 of the first-part pulse 206 of the recording pulse 242 are set so as to be equivalent to the power 226 of the recording pulse 201, and the power 229 of the second-part pulse 204 of the recording pulse 241 and the power 230 of the second-part pulse 207 of the recording pulse 242 are set so as to be invariable regardless of a length of a mark. Further, conditions of power of the recording pulse for each length of spaces are shown. The numbers shown in the table of FIG. 4D correspond to reference numerals which denote the power of the elements shown in FIG. 2.

As described above, with the recording/reproducing method which satisfies the first through fifth requirements, all the marks from the shortest mark to the longest mark are recorded on an optical disk, thereby properly positioning edges of reproduced waveforms of marks. It should be noted that the first through fifth requirements are simply described in this order and may be reordered for implementation.

The method for recording/reproducing data on/from the optical disk according to the present embodiment does not use a pulse shorter than a recording clock cycle so as to record a long mark, as is used in conventional methods. Further, the power of the recording pulse for recording a space is controlled so as to eliminate the influence of heat interference between marks, and therefore the positional conditions of the front and rear edges of the recording pulse are determined as one-dimensional parameter for each length of the mark itself. Further, amplitudes of the front and rear edges of a reproduced waveform of the long mark can be made uniform and the amplitude of a waveform of a shortest mark can be maximized. Therefore, as compared to conventional recording methods, the waveform (write strategy) of the recording pulse is simplified and in addition to this, it is made possible to significantly reduce the number of recording compensation parameters.

Figure 13:
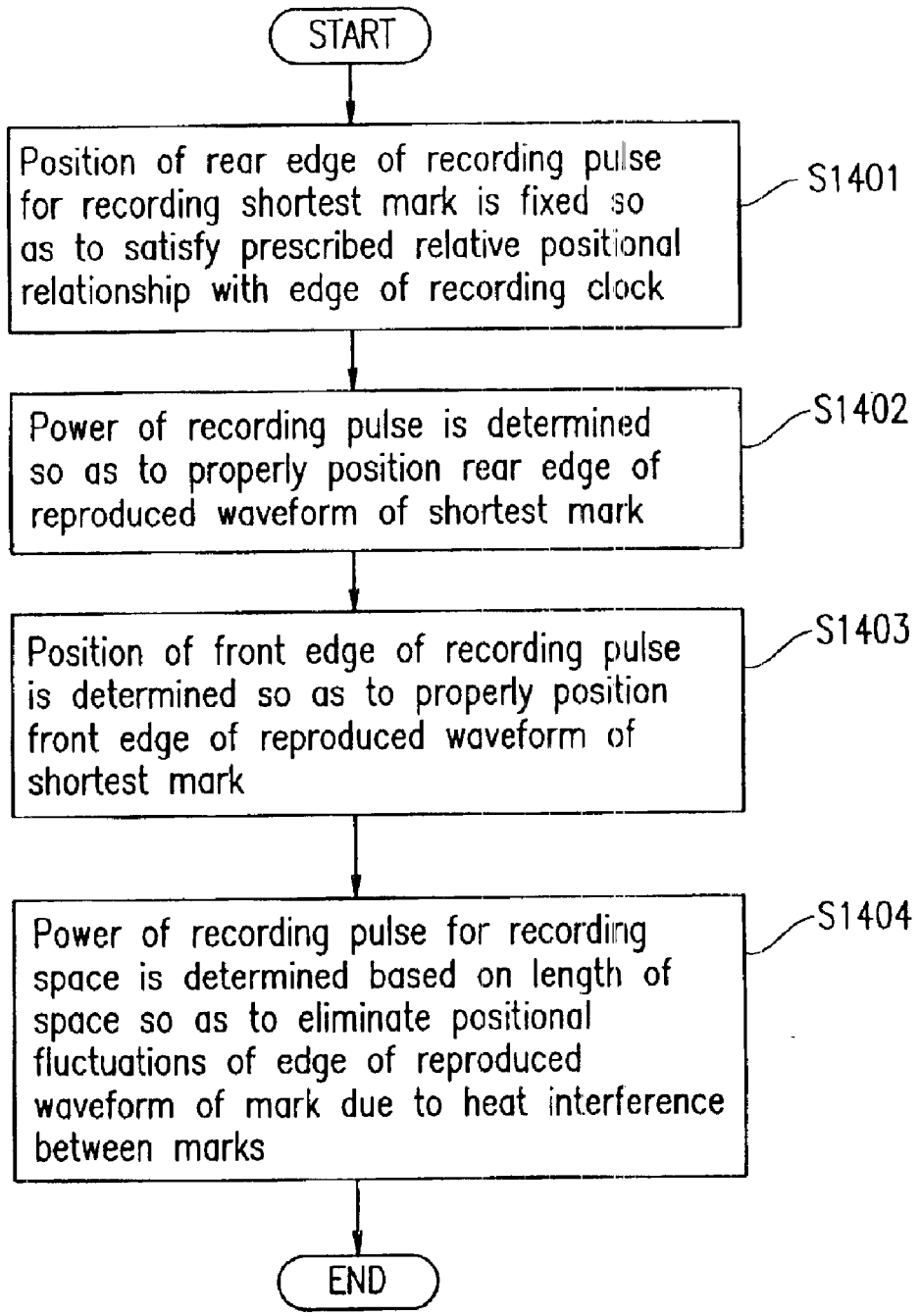
FIG. 13 is a flowchart showing a method for recording/reproducing data on/from an optical disk according to Embodiment 2 of the present invention.
Figure 14:
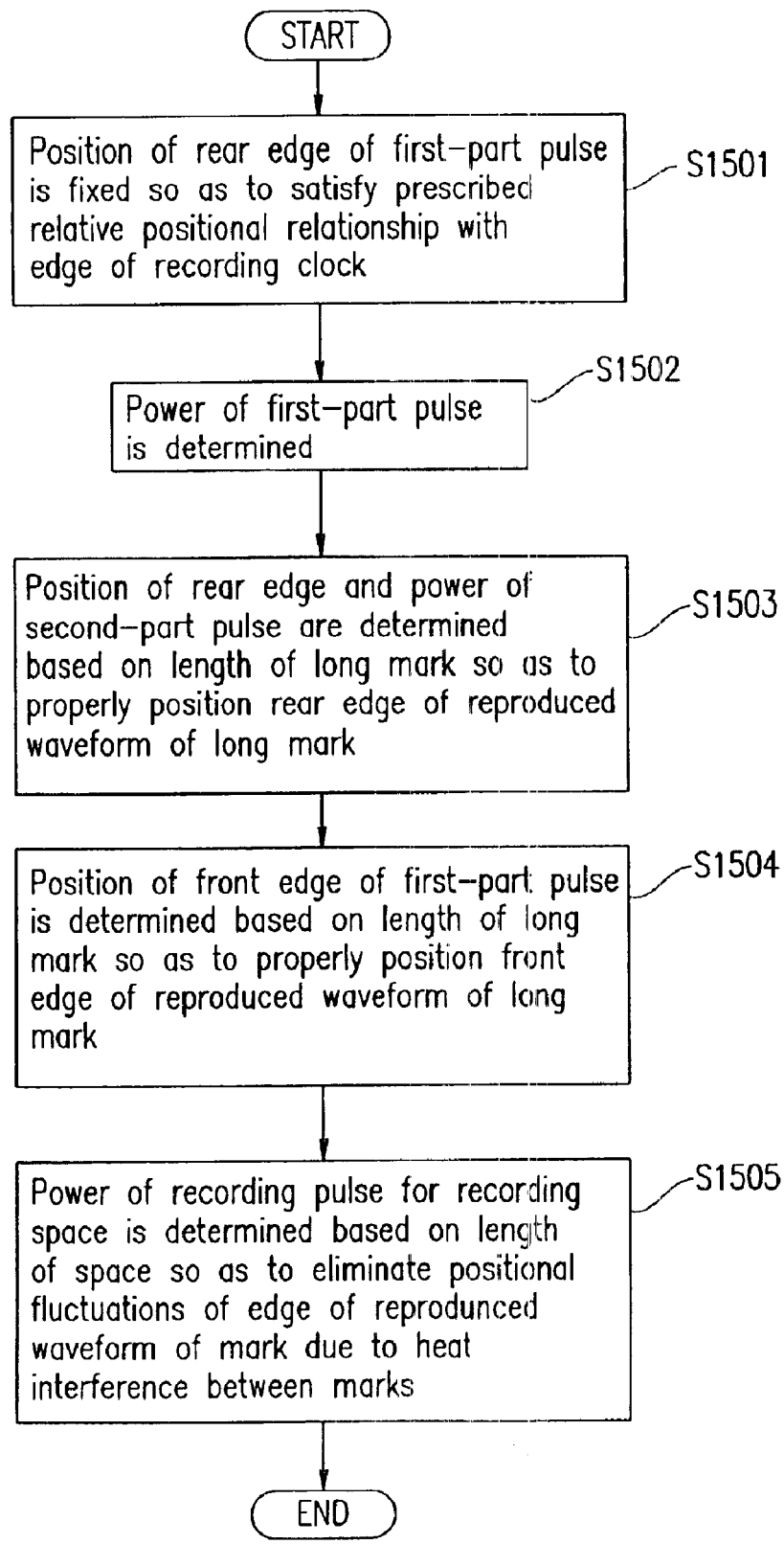
FIG. 14 is a flowchart showing another method for recording/reproducing data on/from an optical disk according to Embodiment 2 of the present invention.
Figure 15:
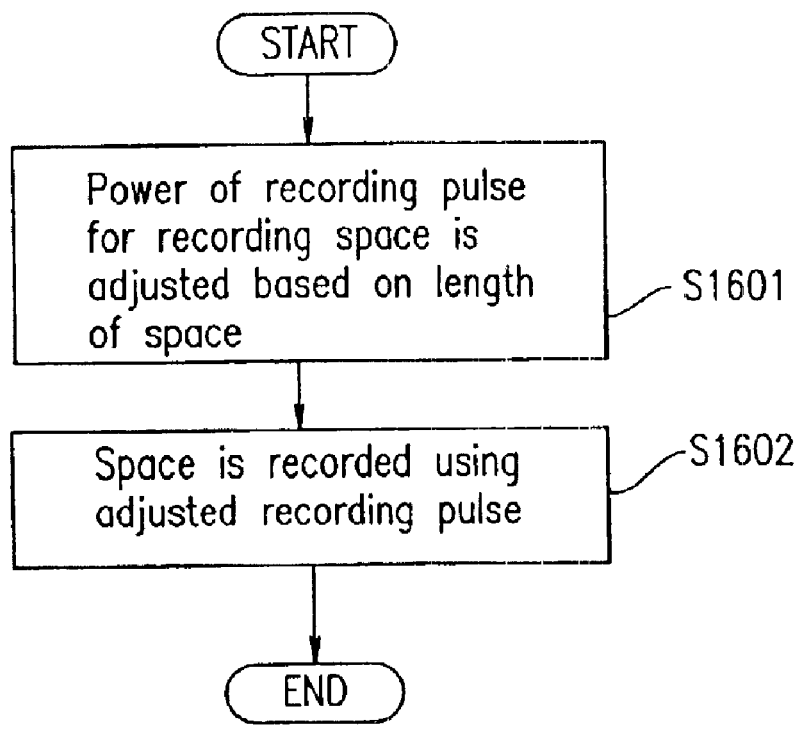
FIG. 15 is a flowchart showing still another method for recording/reproducing data on/from an optical disk according to Embodiment 2 of the present invention.
Figure 16:
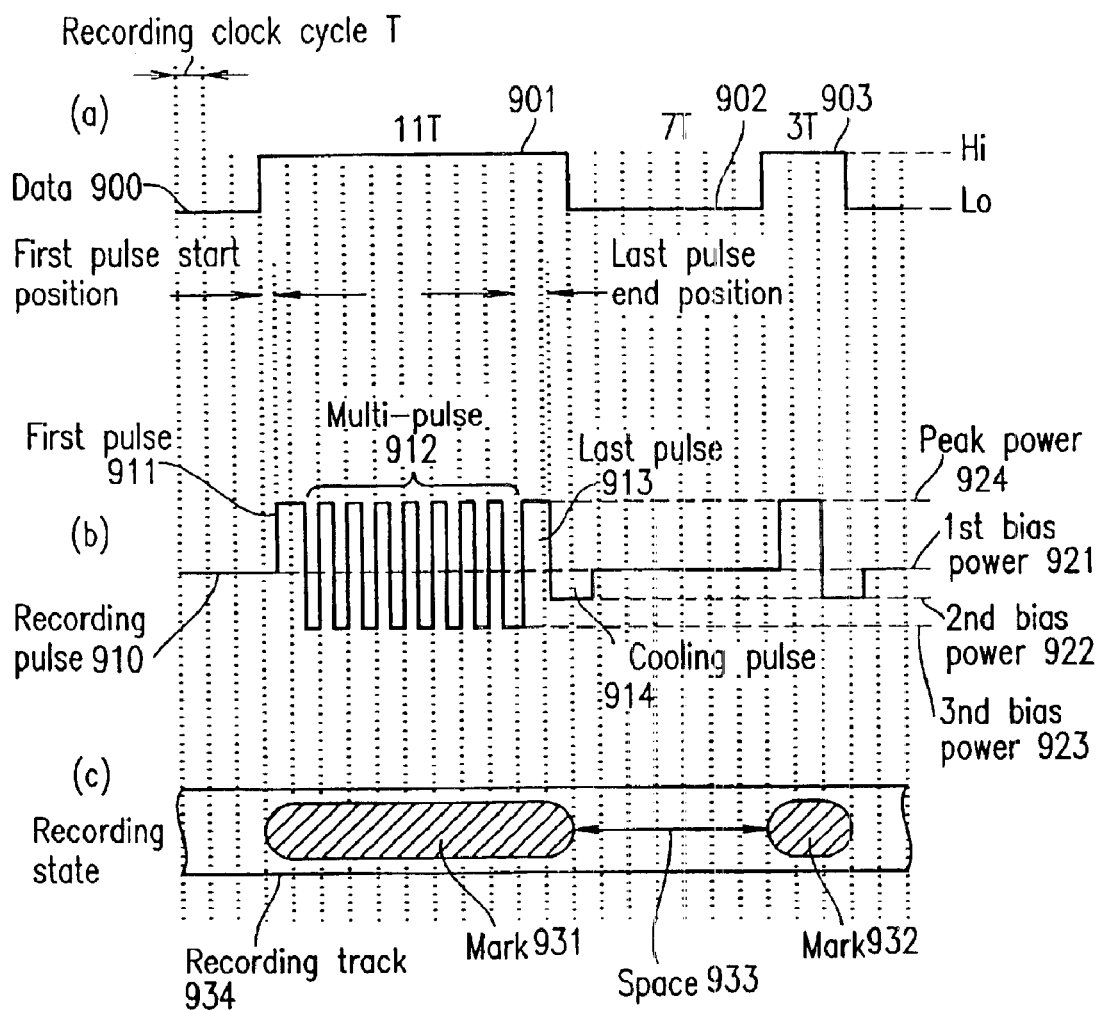
FIG. 16 is a diagram illustrating a conventional data recording method.

A method for obtaining recording compensation conditions through a shortest procedure in test recording of marks and spaces and a data recording/reproducing method are described with reference to FIGS. 2, 7, 13, 14 and 15. FIGS. 13, 14 and 15 are flowcharts each showing a method for obtaining recording compensation conditions through a shortest procedure and a data recording/reproducing method.

Referring to FIGS. 2 and 13, the recording pulse 201 used for recording the shortest mark 108 is described. A position 221 of a rear edge of the recording pulse 201 is fixed so as to satisfy a prescribed relative relationship with an edge of a recording clock (S1401). Next, the power 226 of the recording pulse 201 is determined so as to properly position a rear edge of a reproduced waveform of the shortest mark 108 (i.e., at an intersection point 220) (S1402). Then, the position 215 of a front edge of the recording pulse 201 is determined so as to properly position a front edge of the reproduced waveform of the shortest mark 108 (i.e., at an intersection point 214) (S1403). Then, powers of the recording pulse 213, 211 and 209 for recording spaces 153, 154 and 155, respectively, are determined based on lengths of the respective spaces 153, 154 and 155 so as to eliminate positional fluctuations of the edges of a reproduced waveform of a mark due to heat interference between marks (S1404). This allows the front and rear edges of the reproduced waveform of the shortest mark 108 to be properly positioned (i.e., at the intersection points 214 and 220) without changing a value for the position 215 of a front edge of the recording pulse 201, even when lengths of respective spaces immediately before the shortest marks 108 are different.

Referring to FIGS. 2 and 14, the recording pulse 242 used for recording the long mark 129 is described. A position 291 of a rear edge of the first-part pulse 206 is fixed so as to satisfy a prescribed relative relationship with an edge of a recording clock (S1501). Next, power 228 of the first-part pulse 206 is determined (S1502). The power 228 can be determined so as to have a value equivalent to that of the power 226 of the recording pulse 201.

Next, a position 225 and power 230 of the rear edge of a second-part pulse 207 are determined based on a length of the long mark 129 so as to properly position the rear edge of the reproduced waveform of the long mark 129 (i.e., at an intersection point 224) (e.g., to satisfy flatness requirements of the reproduction amplitude of the long mark 129) (S1503). For example, a position of a rear edge of a second-part pulse of a recording pulse for recording a long mark of nTm (n denotes an integer of four or more) is fixed at a position located backward from a position of a rear edge of a first-part pulse by a length of (n−3)T. The fixed position can be slightly adjusted.

Then, the position 219 of the front edge of the first-part pulse 206 is determined based on the length of the long mark 129 so as to properly position the front edge of the reproduced waveform of the long mark 129 (S1504). Then, powers of the recording pulses for recording spaces are determined based on lengths of the spaces so as to eliminate positional fluctuations of the edges of a reproduced waveform of a mark due to heat interference between marks. Powers of the recording pulses 213, 211 and 209 for recording spaces 153, 154 and 155, respectively, are determined based on respective lengths of the spaces 153, 154 and 155 (S1505). Step S1505 is common to step S1404.

By repeatedly performing the procedures shown in FIGS. 13 and 14 with respect to various combinations of lengths of marks and spaces, all the recording compensation conditions for the shortest marks and long marks are determined in a shortest procedure. The order of the steps shown in FIGS. 13 and 14 is an example and the procedure is not limited to this order. The above is a method for obtaining the recording compensation conditions in a shortest procedure in a test recording.

Referring to FIGS. 2 and 15, a method for recording user data using the determined recording compensation conditions is described. After the recording compensation conditions are determined, the front edge position 215, the rear edge position 221 and the power 226 of the recording pulse 201 as a recording pulse for recording the marks shown in FIG. 2 have fixed values. Adjustments of the power of the recording pulse for recording a space in an operation of recording the user data are performed by selecting a value of a proper power from the recording compensation conditions as shown in FIG. 4D (S1601). The spaces 155, 154 and 153 can be recorded on an optical disk using the recording pulses 209, 211 and 213, respectively, which are adjusted in the manner described above (S1602).

As described above, in the present embodiment, since there are no elements of a recording pulse which are selected or changed according to the conditions before and after the irradiation of the recording pulse in the user data recording operation after the determination of the recording compensation conditions, a data process is readily performed, thereby increasing the speed of the data recording operation.

(Embodiment 3)

Figure 8:
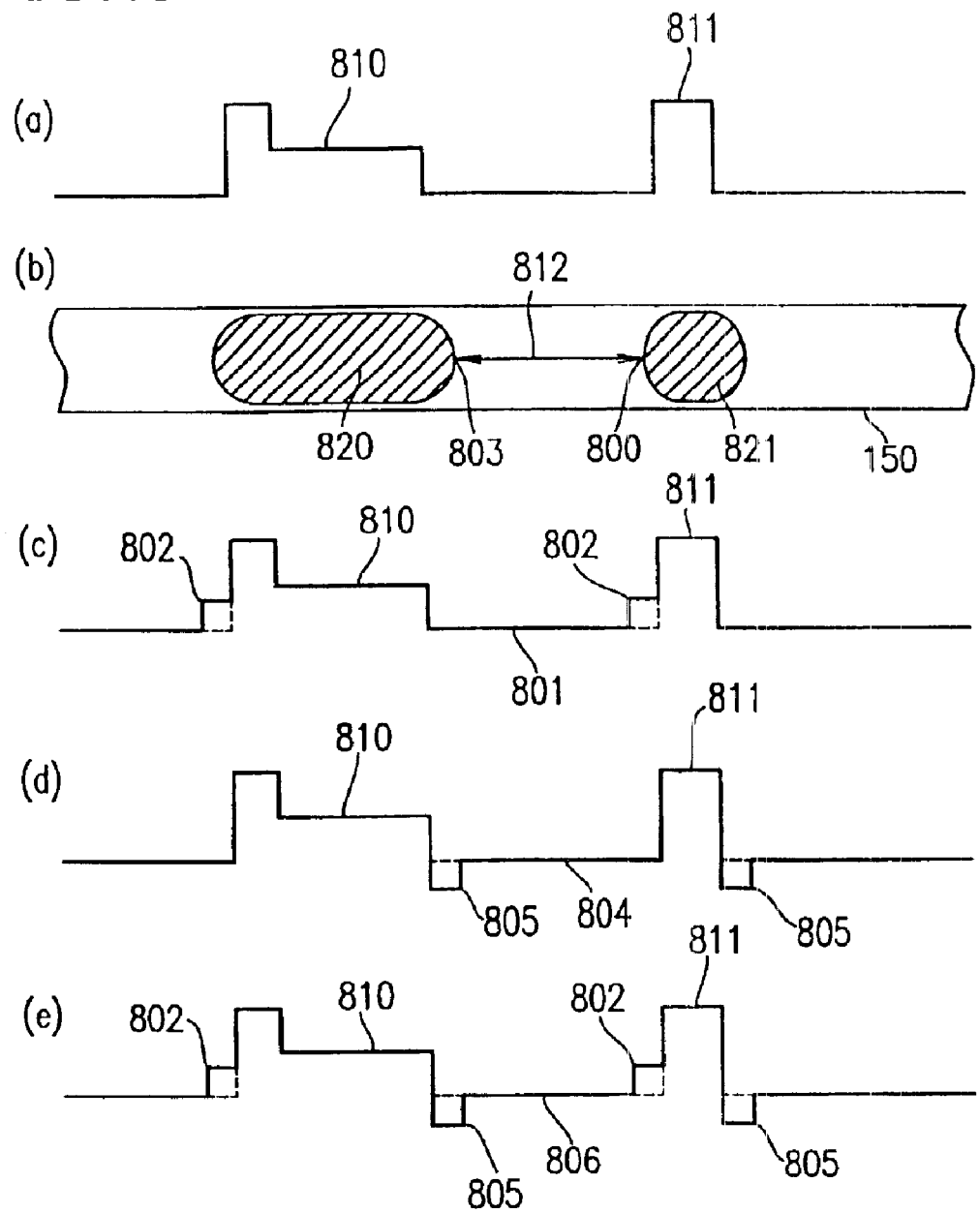
FIG. 8 is a diagram illustrating a method for recording/reproducing data on/from an optical disk according to Embodiment 3 of the present invention.

FIG. 8 is a diagram illustrating a method for recording/reproducing data on/from an optical disk and a method for adjusting the write strategy and recording compensation parameters of a recording pulse for use in the data recording/reproducing method, which are described as Embodiment 3 of the present invention. FIG. 8(a) illustrates recording pulses 810 and 811 respectively used for recording a long mark and a shortest mark using a recording method similar to Embodiments 1 and 2. FIG. 8(b) illustrates a long mark 820 and a shortest mark 821 respectively recorded by the recording pulse 810 and 811. The recording pulse for use in the recording/reproducing method of the present invention can also be performed and effective when preheat and cooling pulses described below are added thereto.

FIG. 8(c) illustrates an embodiment in which a preheat pulse 802 is added at an end position of the recording pulse 801 for forming a space 812. Since the preheat pulse 802 facilitates an increase in temperature at a front edge portion 800 of the shortest mark 821, the front edge portion 800 is readily made amorphous.

FIG. 8(d) illustrates an embodiment in which a cooling pulse 805 is added at a start position of the recording pulse 804 for forming the space 812. Since the cooling pulse 805 increases the speed of cooling a rear edge portion 803 of the long mark 820, the rear edge portion 803 is readily made amorphous.

FIG. 8(e) illustrates an embodiment in which both the preheat pulse 802 and the cooling pulse 805 are added at either end positions of a recording pulse 806 for forming the space 812. Both of the pulses allow the front and rear edge portions 800 and 803 to come into an amorphous state more easily.

The write strategy and recording compensation parameters for use in the recording/reproducing method of the present invention can be implemented prior to the shipment of a recording/reproducing apparatus or can be implemented each time a user uses the recording/reproducing apparatus.

INDUSTRIAL APPLICABILITY

A method for recording/reproducing data on/from an optical disk according to the present invention does not use a multi-pulse having a thin width, and therefore it is easy to increase the rate of a recording operation and control power during the recording operation. Further, it is possible to maximize the amplitude of shortest marks in a high density recording operation and reduce the distortion of long marks. Besides, it is possible to realize the write strategy and recording compensation in which the number of parameters is less than the number of conventionally used parameters. Thus, the present invention is the most suitable for an optical disk system, such as a digital video recorder, in which high speed and high density recording is required.

What is claimed is:

1. A method for adjusting a recording pulse for recording a mark on an optical disk comprising the steps of:
   (a) adjusting a first recording pulse for recording a shortest mark; and
   (b) adjusting a second recording pulse for recording a long mark,
   wherein the first recording pulse is a single pulse having a first power,
   the second recording pulse is a two-stage pulse including a first-part pulse having a second power and a second-part pulse having a third power,
   the step (a) includes the steps of:
   (a1) fixing a position of a rear edge of the first recording pulse so as to satisfy a prescribed relative relationship with a first edge of a recording clock;
   (a2) determining the first power so as to properly position a rear edge of a reproduced waveform of the shortest mark; and
   (a3) determining a position of a front edge of the first recording pulse based on a length of a space immediately before the shortest mark so as to properly position a front edge of the reproduced waveform of the shortest mark, and
   the step (b) includes the steps of:
   (b1) fixing a position of a rear edge of the first-part pulse so as to satisfy the prescribed relative relationship with a second edge of the recording clock;
   (b2) fixing a position of a rear edge of the second-part pulse so as to satisfy the prescribed relative relationship with a third edge of the recording clock;
   (b3) determining the second power;
   (b4) determining the third power so as to properly position a rear edge of a reproduced waveform of the long mark; and
   (b5) determining a position of a front edge of the first-part pulse based on a length of a space immediately before the long mark and a length of the long mark so as to properly position a front edge of a reproduced waveform of the long mark.

2. A method for adjusting a recording pulse according to claim 1, wherein a combination of the first power and the position of the front edge of the first recording pulse is set so as to be a combination which substantially maximizes a reproduction amplitude of the shortest mark among a plurality combinations which realize proper positions of the front and rear edges of the reproduced waveform of the shortest mark.

3. A method for adjusting a recording pulse according to claim 1, wherein a combination of the second and third powers and the position of the front edge of the first-part pulse is set so as to be a combination which substantially flattens a reproduction amplitude of the long mark among a plurality combinations which realize proper positions of the front and rear edges of the reproduced waveform of the long mark.

4. A method for adjusting a recording pulse according to claim 1, wherein the first and second powers are equivalent to each other.

5. A method for adjusting a recording pulse according to claim 1, wherein a position of the rear edge of the second-part pulse is fixed so as to be located behind the rear edge of the first-part pulse by a prescribed clock cycle.

6. A method for recording a mark on an optical disk using the method for adjusting a recording pulse of claim 1 comprising the steps of:
   recording the shortest mark based on the first recording pulse which is at least adjusted according to the step (a); and
   recording the long mark based on the second recording pulse which is at least adjusted according to the step (b).

7. A method for recording a mark on an optical disk comprising the steps of:
   (a) adjusting, based on a length of a space immediately before a shortest mark, a front edge of a first recording pulse for recording the shortest mark which is a single pulse in which a position of a rear edge and power are fixed;
   (b) recording the shortest mark using the first recording pulse adjusted at the step (a);
   (c) adjusting, based on a length of a space immediately before a long mark, a front edge of a second recording pulse for recording the long mark having a prescribed length which is a two-stage pulse including a first-part and second-part pulses having different powers from each other and in which positions of respective rear edges and respective powers of the first-part and second-part pulses are fixed; and
   (d) recording the long mark using the second recording pulse adjusted at the step (c).

8. A method for adjusting a recording pulse for recording a mark and a space on an optical disk comprising the steps of:
   (a) adjusting a first recording pulse for recording a shortest mark;
   (b) adjusting a second recording pulse for recording a long mark; and
   (c) adjusting a third recording pulse for recording a space between marks,
   wherein the first recording pulse is a single pulse having a first power,
   the second recording pulse is a two-stage pulse including a first-part pulse having a second power and a second-part pulse having a third power,
   the third recording pulse is a single pulse having a fourth power,
   the step (a) includes the steps of:
   (a1) fixing a position of a rear edge of the first recording pulse so as to satisfy a prescribed relative relationship with a first edge of a recording clock;
   (a2) determining the first power so as to properly position a rear edge of a reproduced waveform of the shortest mark; and
   (a3) determining a position of a front edge of the first recording pulse so as to properly position a front edge of the reproduced waveform of the shortest mark,
   the step (b) includes the steps of:
   (b1) fixing a position of a rear edge of the first-part pulse so as to satisfy the prescribed relative relationship with a second edge of the recording clock;
   (b2) determining the second power;
   (b3) determining a position of a rear edge and the third power of the second-part pulse based on a length of the long mark so as to properly position a rear edge of a reproduced waveform of the long mark; and (b4) determining a position of a front edge of the first-part pulse based on the length of the long mark so as to properly position a front edge of the reproduced waveform of the long mark, and the step (c) includes the step of (c1) determining the fourth power based on a length of the space so as to eliminate positional fluctuations of an edge of a reproduced waveform of a mark due to heat interference between marks.

9. A method for adjusting a recording pulse according to claim 8, wherein a combination of the first power and the position of the front edge of the first recording pulse is set so as to be a combination which substantially maximizes a reproduction amplitude of the shortest mark among a plurality combinations which realize proper positions of the front and rear edges of the reproduced waveform of the shortest mark.

10. A method for adjusting a recording pulse according to claim 8, wherein a combination of the second and third powers and the position of the front edge of the first-part pulse is set so as to be a combination which substantially flattens a reproduction amplitude of the long mark among a plurality combinations which realize proper positions of the front and rear edges of the reproduced waveform of the long mark.

11. A method for adjusting a recording pulse according to claim 8, wherein the first and second powers are equivalent to each other.

12. A method for recording a mark on an optical disk using the method for adjusting a recording pulse of claim 8 comprising the steps of:

recording the shortest mark based on the first recording pulse which is at least adjusted according to the step (a);

recording the long mark based on the second recording pulse which is at least adjusted according to the step (b); and recording the space based on the third recording pulse which is at least adjusted according to the step (c).

* * * * *